United States Patent [19]

Stamp, Jr. et al.

[11] 4,338,791
[45] Jul. 13, 1982

[54] MICROCOMPUTER CONTROL FOR HEAT PUMP SYSTEM

[75] Inventors: Custis L. Stamp, Jr., Tyler, Tex.; Rollie R. Herzog, Louisville, Ky.

[73] Assignee: General Electric Company, Louisville, Ky.

[21] Appl. No.: 196,425

[22] Filed: Oct. 14, 1980

[51] Int. Cl.³ .................. F25B 13/00; F25B 29/00
[52] U.S. Cl. .................................. 62/160; 165/29; 236/1 EA
[58] Field of Search ............... 165/29, 26; 236/1 EA, 236/1 EB, 46 R, 78 D; 62/160, 175, 228 B, 226; 307/39; 237/2 B

[56] References Cited

U.S. PATENT DOCUMENTS 3,820,713 6/1974 Demaray .................. 236/1 EA
4,172,555 10/1979 Levine ..................... 236/47 X
4,265,299 5/1981 Harnish ................... 165/29

*Primary Examiner*—William E. Wayner
*Attorney, Agent, or Firm*—Frank P. Giacalone; Radford M. Reams

[57] ABSTRACT

A method of controlling energy usage of a multi-state heat pump system in which the system includes a preprogrammed microprocessor-based controller which places and maintains the system in the most energy efficient mode of operation consistent with achieving a desired room temperature level within a reasonable period of time. The controller responds to actual room temperature and a user-inserted temperature setting to place the heat pump system into an operating state indicated by a predetermined set of operating state criteria which establishes the required operating state and the timing of state changes. Changing to higher (less energy efficient) operating states is enabled only when periodic checks of the rate of change of room temperature indicate the desired temperature will not be achieved in a selected time period. The user-inserted temperature setting is modified as a function of outside temperature extremes to modify the target temperature to which the heat pump system operates to further improve energy efficiency of the system.

14 Claims, 14 Drawing Figures

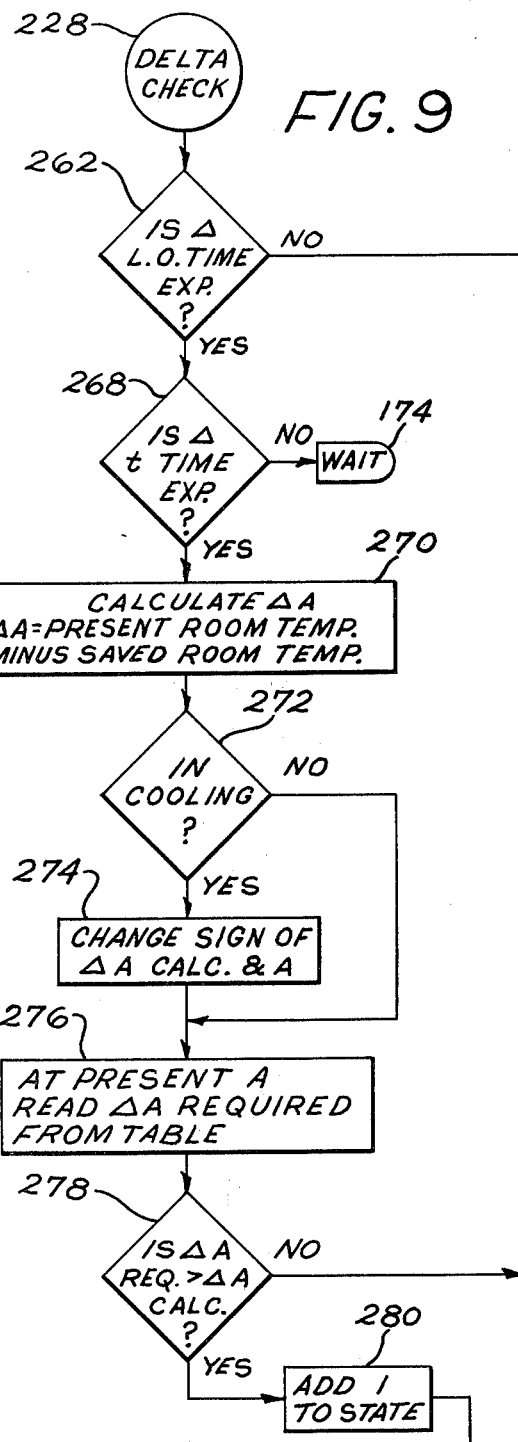
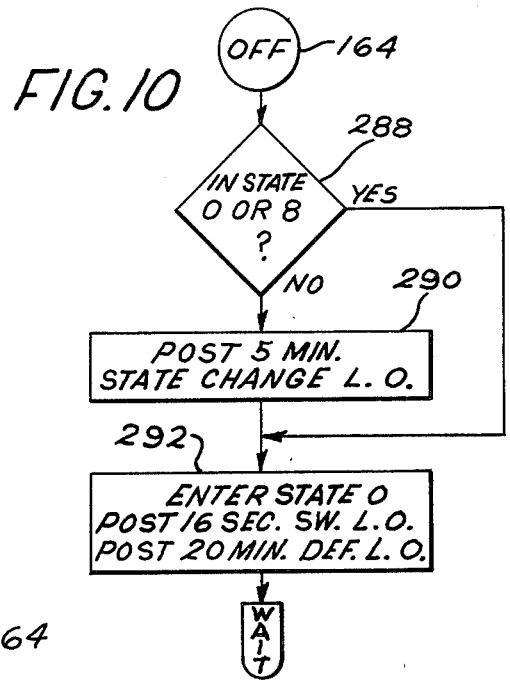
FIG. 9
FIG. 10

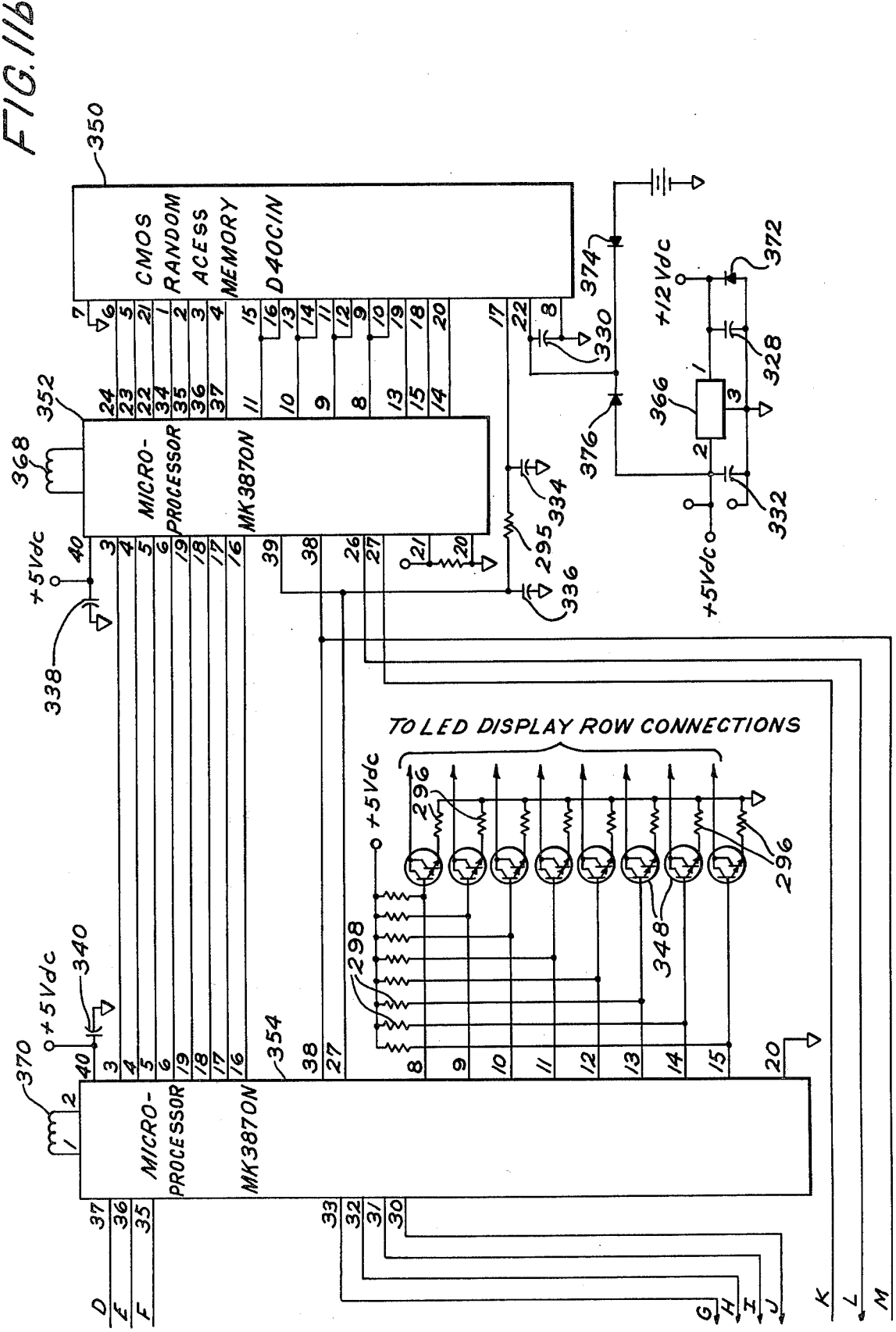

MICROCOMPUTER CONTROL FOR HEAT PUMP SYSTEM

CROSS REFERENCE TO RELATED APPLICATIONS

This application is related to concurrently filed application Ser. Nos. 196,411; 196,412; 196,413; and 196,414, each filed jointly in the names of Custis L. Stamp, Jr. and Rollie R. Herzog, and each assigned to General Electric Company, the assignee of the present invention.

BACKGROUND OF THE INVENTION

This invention relates generally to means for automatically controlling the operation of a heat pump system so as to manage and conserve the energy used by the system in meeting the room temperature requirements of the user with improved efficiency and at reduced operating costs. More specifically, the present invention relates to the use of a first microprocessor-based electronic circuit to form a user operated console for the manual entry therein of the user's room temperature requirements and a second microprocessor-based electronic circuit forming a heat pump functional system controller connected to the console for operating a heat pump to meet the user's requirements efficiently and at reduced operating costs as compared with manually controlled prior art heat pumps.

Heat pump systems are well known in the art and typically are provided in the heating mode with two or more states or levels of heating capacity. The first state normally involves only the operation of the heat pump compressor and associated refrigerant circuit to transfer heat energy from outdoor air or some other heat reservoir to the enclosed indoor space which is to be heated. In a single speed heat pump, changing to higher states or levels of heating capacity involves the use of one or more supplemental heat sources, such as electrical resistance strip heaters. In heat pumps having multi-speed compressors, additional states or levels of heating capacity can be provided by changing the compressor speed which changes the rate of heat transfer from outdoor space to the indoor enclosed space. In all such cases, the higher states of heating capacity are less efficient than the lower states, with the first state, i.e. compressor-only operation, being the most efficient. When operating in the cooling mode, variable states of operating capacity can only be provided by running the compressor at two or more operating speeds which changes the rate of heat exchange from the indoor enclosed space to the outdoor space.

Control of the operation of such prior art heat pumps is generally by means of an electromechanical form of a thermostat which includes a separate temperature sensor assembly and switching arrangement for each level of heating capacity. These temperature assemblies are usually mechanically interconnected such that a room temperature droop or undershoot must occur below the first stage operating point in order to energize the second stage and so on for the higher stages of heating capacity. Manual operation of this prior art thermostat in an attempt to increase system efficiency by reducing the setpoint, i.e. the desired room temperature setting, during periods of non-occupation of a building, for example, and subsequently increasing the setpoint during periods of occupancy creates an inefficient mode of operation while the heat pump is recovering from this setback of temperature. The reason for this is that this form of thermostat immediately increases the heat pump stage to its highest capacity in order to raise the room temperature and thus operates continually at its least efficient operating mode until the room temperature reaches the setpoint temperature.

Improved heat pumps have been developed which have variable heating and cooling compressor operating capacity. The intended benefit of such prior art variable capacity systems is, however, largely unrealized since it is extremely difficult for the user to determine whether the pump should be operated at a high or low compressor operating capacity in order to achieve the desired results in all circumstances. Moreover, a thermostat of the prior art type becomes complex and allows a significant temperature droop to occur. Furthermore, while high or low capacity heating or cooling may be required over a given period of time, short term changes in the numerous variables which affect heating and cooling rates can occur at any time in response to which a temporary change in the heating or cooling capacity of the heat pump would improve its efficiency and still permit user requirements to be met in a practical and reasonable time frame. The numerous variable factors which affect heating and cooling efficiency include not only the difference between the room temperature desired and the actual room temperature (the error temperature) but also the time rate of change of indoor temperature, and the outdoor temperature, just to mention a few. It is therefore not feasible to expect the operator of such prior art non-automatic variable capacity heat pumps to continually measure all of these factors and engage in the relatively complex computations from time to time that would clearly be required in order to operate these pumps at their most efficient capacities at all times.

The present invention substantially overcomes these and other difficulties encountered in the use of prior art heat pumps. It is therefore an object of the invention to provide an automatically controlled multi-state heat pump system and a method for controlling the energy usage of the system.

It is another object of the invention to provide a method of controlling a multi-state heat pump system and an energy management system therefor wherein the operating state, and consequently the energy usage, of the system is automatically controlled as a function of the rate of change of room temperature being controlled by the heat pump system.

It is also an object of the invention to provide a method of control and an energy management control system for a multi-state heat pump wherein energy usage of the heat pump system is controlled in accordance with the differential in temperature between the actual room temperature and the desired temperature setting to avoid excessive use of energy while attempting to reach the desired temperature within a reasonable time frame.

It is a further object of the invention to provide a heat pump system which is controlled, under certain operating conditions, to a target temperature which may differ from the user-inserted room temperature setting by a predetermined function of outdoor temperature in such a manner as to increase the perceived comfort offered by the heat pump system to the user.

Thus, in accordance with one of the aspects of the invention, there is provided a method of controlling a multi-state heat pump system to minimize energy usage while the system is being operated to bring the temperature of an enclosed space to a desired temperature level, which method comprises the steps of establishing a target temperature value representative of the desired temperature, sensing actual temperature of the enclosed space and initiating operation of the heat pump system in response to a differential between the actual and target temperatures. The method of this aspect of the invention further includes the steps of measuring the time rate of change in the actual temperature at the expiration of preselected time intervals during which an increase in operating state of the heat pump system to a higher level of energy usage is inhibited and increasing the heat pump system to the next higher operating state upon expiration of the preselected time intervals only when the time rate of change of actual temperature is less than a value required to substantially reach the target temperature within a predetermined time period.

In accordance with another aspect of the method of the invention, when a differential is sensed between the actual and target temperatures, the operation of the heat pump is initiated in the most energy efficient operating state needed to begin changing the actual temperature of the enclosed space toward the target temperature after which a further increase in operating state is inhibited for a fixed time interval during which the time rate of change is the actual temperature is measured. Then, in accordance with this aspect of the invention, a state change increase is initiated at the expiration of the inhibit time interval only when the rate of change in actual temperature fails to meet a predetermined criterion value which is in effect for the magnitude of the differential between actual and target temperatures existing at the time of expiration of the inhibit time interval, wherein the predetermined criterion value is representative of the rate of actual temperature change needed to reach the target temperature within a preselected time period, such as one hour from the first initiation of the heat pump system operation.

In accordance with a still further aspect of the invention, an energy usage management system is provided for a heat pump system having a plurality of operating states, each state representing a different level of energy usage wherein the energy management system comprises means for sensing actual temperature of the enclosed space and user-operated means for establishing a desired temperature setting for the enclosed space. The management system of the invention further includes means providing an operating state change criteria table comprised of a plurality of values of temperature differential between the actual and desired temperature levels at which operating state changes occur. The span of temperature differentials resulting in inter-state changes is preferably substantially greater, for example twice, than the span of temperature differentials resulting in intra-state changes. Inter-state differentials are those which occur when moving between adjacent operating states in the same direction as that of an immediately preceding state change, and intra-state changes are those which occur when moving between adjacent operating states in a direction opposite to that of the immediately preceding state change. The energy management system of the invention further includes means for comparing the sensed actual temperature to the desired temperature setting to determine the differential therebetween and means for comparing the temperature differential to the state change criteria table to derive a control effect representative of whether a particular operating state change is to occur. The system still further includes means responsive to the desired control effect for changing the operating state of the heat pump system to the particular state needed to bring the actual temperature to the desired temperature setting within a preselected time period.

In accordance with another aspect of the invention in the energy management system, means are provided for sensing the temperature outside the enclosed space and for adjusting the user inserted desired temperature setting upward as a predetermined function of the difference between outside temperature and the user inerted temperature setting to improve the perceived comfort offered to the user by the heat pump.

These and other objects of the present invention will become apparent to those skilled in the art from the following detailed description and attached drawings upon which, by way of example, only a preferred embodiment of our invention is illustrated.

BRIEF DESCRIPTION OF THE DRAWINGS

FIG. 9 shows a block diagram or flow chart for implementation of the delta check function by the energy management means of the system of FIG. 1 according to the tabulated rules on the right side of the graph of FIG. 5.

FIG. 10 shows a block diagram or flow chart for off processing the system of FIG. 1 following exit from either the heating or cooling modes of FIGS. 7 and 8.

DESCRIPTION OF THE PREFERRED EMBODIMENT

Figure 1:
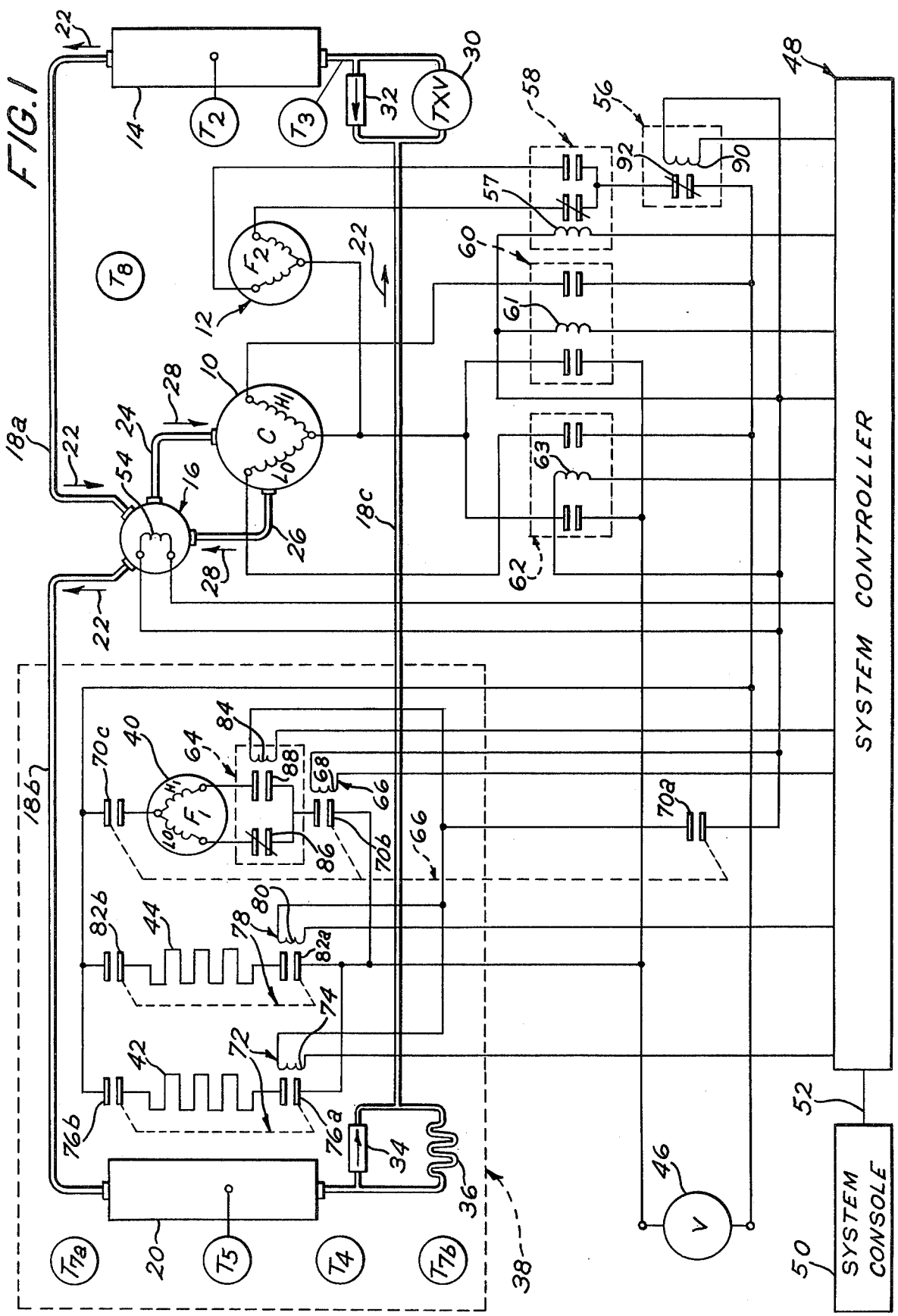
FIG. 1 shows a schematic diagram of an automatic energy management control means for a heat pump system, thus illustrating one preferred embodiment of the present invention.

Referring now to FIG. 1, there is shown, in one preferred embodiment of the present invention, a heat pump system having as conventional components a two speed compressor 10, a two speed outdoor fan 12 (also designated $F_2$ in FIG. 1), an outdoor heat exchanger coil 14, and a fluid switchover valve 16. The valve 16 provides means for reversing the direction of flow of a fluid refrigerant through a series of pipe lines 18a,b and c, the outdoor coil 14 and an indoor heat exchanger coil 20 in order to switch the operation of the system between a heating mode and a cooling mode (including defrosting operation). A series of arrows, designated 22, are taken as indicating the direction of refrigerant flow through the lines 18a,b,c when the system is operating in the heating mode. The refrigerant flows through the lines 18a,b,c in a direction opposite that of the arrows 22 when the system is operating in the cooling mode, including the performing of a defrosting operation. The refrigerant always flows from the valve 16 to a low pressure inlet side of the compressor 10 through a line 24, and back to the valve 16 from a high pressure output port of the compressor 10 through a line 26 in directions indicated by arrows 28 regardless of whether the system is operating in the heating or cooling mode.

When the system is operated in the heating mode, a conventional fluid expansion valve 30 permits the refrigerant to expand rapidly therethrough to cool the refrigerant to its lowest temperature within the closed fluid circuit just prior to entry into the cold end of the outdoor coil 14. A conventional one-way check valve 32 inhibits flow of the refrigerant therethrough so that the refrigerant is shunted through the valve 30 at all times during heating mode operation, but freely allows passage of the refrigerant therethrough when the system is defrosting or otherwise operating in the cooling mode. A second one-way check valve 34 permits the refrigerant to flow freely from the indoor coil 20 into the line 18c when the system operates in the heating mode, but shunts the refrigerant from the line 18c into the coil 20 through a conventional fluid restrictor or capillary tube 36 during defrost and cooling mode operation.

A dashed line 38 represents a building or enclosed structure being air conditioned by the system, within which is disposed all of the indoor components of the fluid conductive circuit of the system. Other components of the system of FIG. 1 include a two-speed indoor fan 40 (also designated $F_1$ in FIG. 1) and a pair of resistance heating elements or strip heaters 42, 44. The compressor 10, fans 12 and 40, and the strip heaters 42, 44 are powered by a conventional voltage source 46 such as, for example, the usual commercially available 240 volt, single phase supply.

Now, in accordance with the principles of our invention, there is also shown in FIG. 1, a programmed electronic system controller 48 adapted to, among other functions, control the various heating and cooling states of the system, as hereinafter explained, to improve the energy efficiency of heat pump operation consistent with the demands and comfort requirements of the user. A system console 50 containing various input keys, display registers and associated logic circuitry permits manual entry of control data into the system. A suitable cable or wiring harness 52 connected between the controller 48 and the console 50 permits the latter to be located either near or remote with respect to the former at any location considered convenient for the entry of control data to the system.

Upon command, the controller 48 applies a suitable operating potential across a solenoid coil 54 of the valve 16 to switch the state thereof so as to reverse the flow of refrigerant through the lines 18a,b,c and the heat exchanger coils 14 and 20 to switch the system from the heating mode to the cooling mode. Likewise, the controller 48 also applies suitable operating potentials to a series of relays including a defrost relay 56, an outdoor fan speed relay 58, a high speed compressor relay 60, a low speed compressor relay 62, and an indoor fan speed relay 64. Other relays controlled by the controller 48 include an indoor fan power ON relay 66 consisting of a coil 68 and three ganged sets of contacts 70a,b,c a first strip heater power ON relay 72 consisting of a coil 74 and two sets of ganged contacts 76a,b, and a second strip heater power ON relay 78 consisting of a coil 80 and two sets of ganged contacts 82a,b. It should be noted that neither of the strip heaters 42, 44 can be energized unless the indoor fan power ON relay 66 is energized such that the fan 40 is operating at either low or high speed depending upon whether the relay 64 is de-energized or energized. A normally closed set of contacts 86 energizes a low speed coil of the fan 40 to allow low speed fan operation when the relay 66 is energized and when the relay 64 is de-energized. Conversely, a normally open set of contacts 88 is closed to energize the high speed coil of the fan 40 to allow high speed fan operation when both of the relays 64 and 66 are energized. The relay 58 controls the speed of operation of the outdoor fan 12 in a similar manner, i.e. low speed operation when relays 56 and 58 are de-energized, and high speed operation when the relay 56 is de-energized and relay 58 is energized. One or both of the strip heaters 42, 44 may be energized when the fan relay 66 is energized depending upon whether the controller 48 energizes only the relay 72 or both the relays 72, 78.

Figure 2:
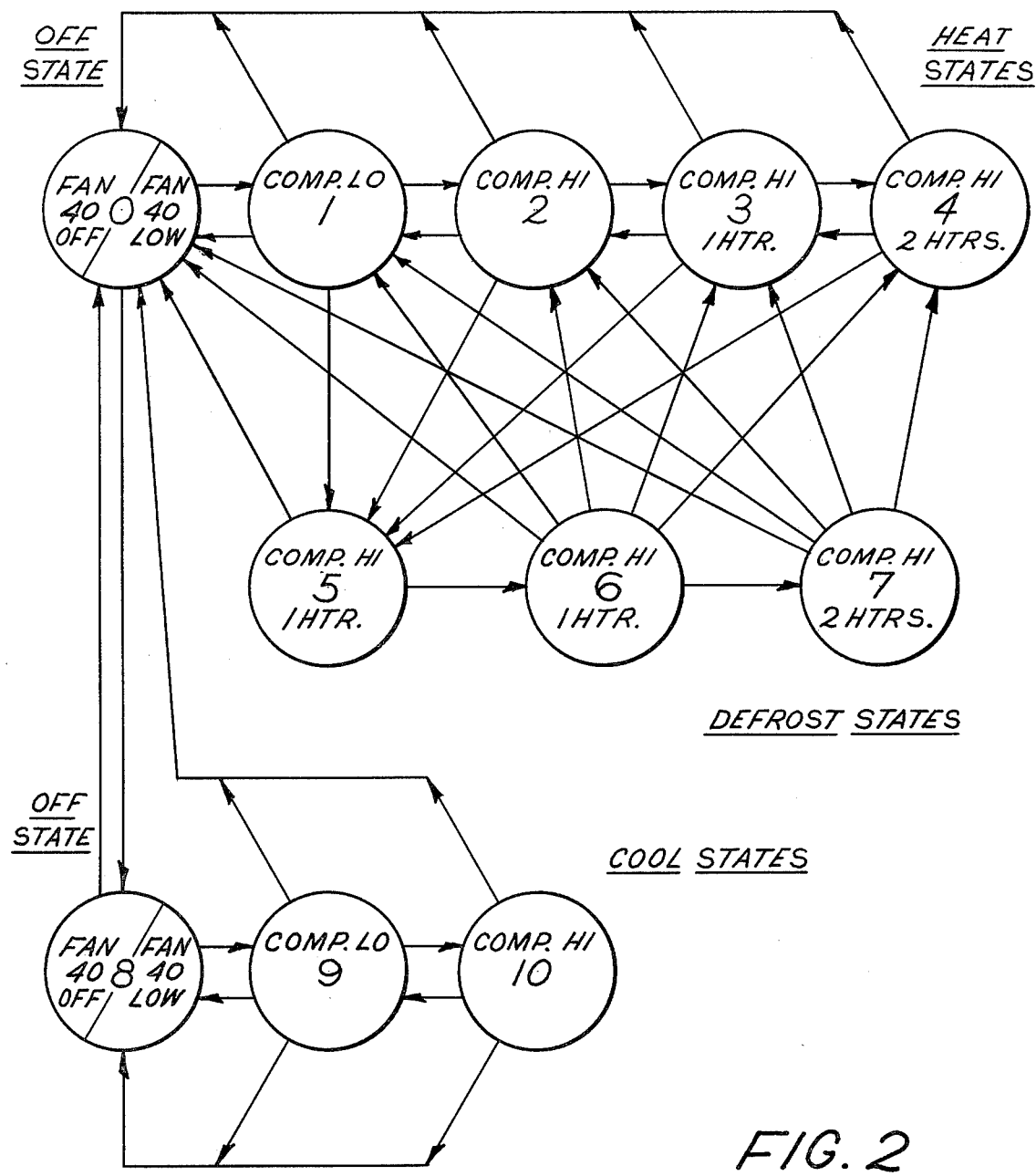
FIG. 2 shows a diagram illustrating the various different energy states of the system of FIG. 1 with the permissible changes between such states according to a feature of the invention.

Referring now particularly to the diagram of FIG. 2, the various states of operation and the permissible changes of state of the system of FIG. 1 are diagramatically illustrated. In the presently preferred form of the invention, there are four states of heating, designated by the circles numbered 1-4, three states of defrost operation, designated by the circles numbered 5-7, and two states of compressor energized cooling, designated by the circles numbered 9 and 10. States 0 and 8 are the "OFF" states of heating and cooling, respectively, wherein the compressor 10 is rendered inoperative in that both of the compressor speed relays 60 and 62 of FIG. 1 are de-energized. When the system of FIG. 1 is in either of the OFF states 0 or 8, the indoor fan 40 may either be inoperative or operating at low speed, wherein the relay 64 is de-energized and the relay 66 may be either de-energized or energized. TABLE I shows the condition of various components of the system of FIG. 1 corresponding to each of the states of system operation of FIG. 2. The term "ON" appearing at various positions in TABLE I means that the component identified on the same line at the far left of the table is energized. Blank positions in the table indicate that the corresponding component is de-energized.

TABLE I

| SYSTEM COMPONENTS | SYSTEM STATES | | | | | | | | | | |
|---|---|---|---|---|---|---|---|---|---|---|---|
| | 0 | 1 | 2 | 3 | 4 | 5 | 6 | 7 | 8 | 9 | 10 |
| Defrost Relay 56 | — | — | — | — | — | — | ON | ON | — | — | — |
| O.D. Fan Speed Relay 58 | — | — | ON | ON | ON | ON | ON | ON | — | — | ON |
| I.D. Fan Pwr. on Relay 66 | ON/OFF | ON | ON | ON | ON | ON | ON | ON | ON/OFF | ON | ON |
| I.D. Fan Speed Relay 64 | — | — | ON | ON | ON | — | — | — | — | — | ON |
| 1st Strip Heat Pwr. on Relay 72 | — | — | — | ON | ON | ON | ON | ON | — | — | — |
| 2nd Strip Heat Pwr. on Relay 78 | — | — | — | — | ON | — | — | ON | — | — | — |
| Comp. Low Speed Relay 62 | — | ON | — | — | — | — | — | — | — | ON | — |
| Comp. High Speed Relay 60 | — | — | ON | ON | ON | ON | ON | ON | — | — | ON |
| Switchover Valve Solenoid 54 | — | — | — | — | — | — | ON | ON | ON | ON | ON |

The lowest capacity heating state, state 1, occurs when the compressor 10 is operated at low speed while the next higher capacity heating state, state 2, occurs when the compressor 10 is operated at high speed. In both states 1 and 2, the strip heaters 42, 44 are inoperative. State 3 occurs when the first strip heater 42 is energized along with high speed compressor operation, and state 4, the highest capacity heating state of the system occurs when both strip heaters 42 and 44 are energized along with high speed compressor operation. In all of the heating states, 1-4, the defrost relay 56 and valve 16 are de-energized. Note in FIG. 2 that increases in the heating state must occur sequentially such that the skipping or bypassing of an intermediate state is not permitted. On the other hand, while the heating states may be reduced sequentially without bypassing an intermediate heating state, it is also possible to go from any one of the heating states 1-4 directly to the off heating state 0, as when the required temperature level in the building 38 becomes satisfied as when the user manually enters a new setpoint or an automatic setpoint change occurs at a point in time when the system is in a given one of those states.

Each higher heating state 0-4 is equivalent to a higher level of energy usage in the system operation and thus a corresponding lower efficiency of operation. Therefore, the rules for changing state are such that the preferred state is the lowest operating state which will satisfy the user's requirements. The user's room temperature requirements are inserted or entered into the control via console 50 in the form of a setpoint temperature setting representing the room temperature desired by the user to be achieved by the system. This setpoint temperature whether used directly or modified as a function of the outdoor temperature, in a manner to be described subsequently, represents a target temperature which is compared in the system controller 48 with the actual sensed room temperature to establish the operating state for the heat pump system. The following rules, which are exemplary for the system of FIG. 1, apply to the heating state changes, states 0-4. The delta check criterion referred to in these rules is explained more fully hereinafter in connection with a discussion of FIG. 4.

| From State | To State | Requires |
|---|---|---|
| 0 | 1 | (a) Room temperature lower than target temperature |
| | | (b) and greater than 5 minutes in state 0 or 8. |
| 1 | 2 | (a) Room temperature lower than target temperature −.5° C. |
| | | (b) and greater than 10 minutes in state 1 |
| | | (c) and delta check allows increase. |
| 2 | 3 | (a) Room temperature lower than target temperature −1.0° C. |
| | | (b) and greater than 10 minutes in state 2 |
| | | (c) and delta check allows increase. |
| 3 | 4 | (a) Room temperature lower than target temperature −1.5° C. |
| | | (b) and greater than 10 minutes in state 3 |
| | | (c) and delta check allows increase. |
| 4 | 3 | (a) Room temperature greater than target temperature −1.25° C. |
| | | (b) and greater than 5 minutes in state 4. |
| 3 | 2 | (a) Room temperature greater than target temperature −.75° C. |
| | | (b) and greater than 5 minutes in state 3. |
| 2 | 1 | (a) Room temperature greater than target temperature −.25° C. |
| | | (b) and greater than 10 minutes in state 2. |
| 1 | 0 | (a) Room temperature greater than target temperature +.25° C. |
| | | (b) and greater than 10 minutes in state 1 |
| | | (c) or console mode has changed. |
| 2 | 0 | (a) Room temperature greater than target temperature +.25° C. |
| | | (b) and greater than 10 minutes in state 2 |
| | | (c) or console mode has changed. |
| 3 | 0 | (a) Room temperature greater than target temperature +.25° C. |
| | | (b) and greater than 5 minutes in state 3 |
| | | (c) or console mode has changes. |
| 4 | 0 | (a) Room temperature greater than target temperature +.25° C. |
| | | (b) and greater than 5 minutes in state 4 |
| | | (c) or console mode has changed. |

It may be noted that the state changes as described above specify a minimum time of 5 minutes in the Off state 0 before turning on, a minimum time of 10 minutes in each of the compressor On states 1 and 2 before either increasing or decreasing the state, a minimum time of 10 minutes in resistance heating state 3 before increasing the state, and a minimum time of 5 minutes in the resistance heating states 3 and 4 before decreasing the state. These or similar minimum time intervals are provided to insure that the compressor pressures are equalized prior to starting, and to insure that the time in a heating state is sufficient to eliminate relay chatter and to improve the system efficiency. Once started, a compressor should continue in operation for at least a minimum period of time, such as 10 minutes, so that its start up losses are minimized.

The system may also switch from any one of the four heating states directly to defrost state 5 when the conditions requiring defrost occur, as is more fully explained in the aforementioned application Ser. No. 196,411. Note that defrost is always commenced by entry of the system from a given heating state into state 5. State 5 is provided as a transitional state in a multi compressor speed heat pump system in which the compressor 10 is operated at high speed during defrost. Since the system might have entered state 5 from state 1 wherein the compressor 10 was operating at low speed, a few seconds of delay time are provided by transitional state 5 to insure that the compressor 10 has come up to full speed before the actual defrost operation of state 6 commences. In the present example, the system preferably remains in state 5 for about 6 seconds before shifting to state 6 at which point the valve 16 and defrost relay 56 are energized to reverse the flow of refrigerant in the lines 18a,b,c and to shut down the outdoor fan 12, respectively. Upon entry of the system into state 5, the first strip heater 42 is energized and remains in such a condition throughout the defrosting operation to add a slightly net positive amount of heat to the building 38 to offset the cooling of the building that otherwise occurs during defrost. If heat loss from the building 38 is excessive or if the system must remain in defrost for a long period of time or for any other reason that causes the building temperature to decrease while the system is in the lowest state of defrost, the controller 48 shifts the system into the next higher defrost state, state 7, wherein the second strip heater 44 is energized. Upon completion of the defrost operation, the system shifts from either state 6 or 7 back to the heating state which it was in at the time it shifted to defrost state 5. After returning to the particular heating state which the system was in, the system may shift back to the heating Off state, state 0, as where the required temperature level in the building 38 is satisfied. In the event the user has switched the system out of the heating mode while a defrost operation is in progress, the system will go directly to the Off heating state 0.

When the console 50 is switched from the heating to the cooling mode, the controller 48 switches the system from any of the heating states 1-4 or defrost states 5-7 to the Off heating state 0 and, thereafter, to the Off cooling state 8 after which the system may enter the lowest capacity cooling state, state 9. As noted in TABLE I, the indoor fan 40 and compressor 10 operate at low speeds (relay 64 de-energized and relay 62 energized) in cooling state 9 and switch to high speed operation (relays 60 and 64 energized) upon entry of the system into the higher capacity cooling state 10.

Each higher cooling state 8-10 is equivalent to a higher level of energy usage during cooling operation and therefore a lower efficiency. Exemplary rules for changing state are similar to the heating state change rules may be as defined below for the system of FIG. 1:

| From | To State | State Requires |
|---|---|---|
| 0 | 8 | (a) Room temperature greater than target temperature |
|   |   | (b) and greater than 5 minutes in state 0. |
| 8 | 9 | (a) Room temperature greater than target temperature |
|   |   | (b) and greater than 5 minutes in state 8 or 0. |
| 9 | 10 | (a) Room temperature greater than target temperature +.5° C. |
|   |   | (b) and greater than 10 minutes in state 9 |
|   |   | (c) and delta check allows increase. |
| 10 | 9 | (a) Room temperature less than target temperature +.25° C. |
|   |   | (b) and greater than 10 minutes in state 10. |
| 9 | 8 | (a) Room temperature less than target temperature −.25° C. |
|   |   | (b) and greater than 10 minutes in state 9. |
| 10 | 8 | (a) Room temperature less than target temperature −.25° C. |
|   |   | (b) and greater than 10 minutes in state 10. |
| 10 | 0 | (a) Console mode has changed. |
| 9 | 0 | (a) Console mode has changed. |
| 8 | 0 | (a) Console mode has changed. |

The controller 48 may be adapted to control the heat pump so as to regulate the indoor temperature within the enclosure 38 to any desired value within a selected range of temperatures such as, for example, 55° F. to 95° F. The user selects the indoor temperature desired which falls within such control range and enters the desired temperature (hereinafter called "setpoint temperature") in the console 50. The console 50 communicates the setpoint temperature to the controller 48 which, dependent on the outdoor temperature ($T_8$ in FIG. 1), may add a small temperature increment or modifier to the setpoint temperature to provide a target temperature which the system will seek to read in the enclosure 38. In an actually constructed embodiment of the invention, the modifier varies in increments of 0.25° C. as shown in TABLE II depending upon the outdoor temperature value.

TABLE II

| Outdoor Temp ($T_8$) Heating Mode | Outdoor Temp ($T_8$) Cooling Mode | Setpoint Temp. Modifier |
|---|---|---|
| −1.0 to −6.5° C. | 26.5 to 32.0° C. | +0.25° C. |
| −6.5 to −12.0° C. | 32.0 to 37.5° C. | +0.50° C. |
| −17.5 to −12.0° C. | 37.5 to 43.0° C. | +0.75° C. |
| Below −17.5° C. | Above 43.0° C. | +1.00° C. |

Thus, the setpoint modifier establishes a target temperature which the system seeks to satisfy so as to be slightly higher than the setpoint temperature established by the user and entered in the console 50 in both the heating and the cooling modes of operation. In the heating mode of operation, as shown in TABLE II, the modifier added to setpoint temperature increases as the outdoor temperature falls through successively colder temperature extremes. It will be appreciated that the rate of heat loss from the enclosed space at these cold outdoor temperatures is substantially greater than occurs at more moderate temperatures. The purpose of increasing the target temperature in combination with the temperature droop required for higher states is to cause the heat pump system either to enter or remain in a higher state of heating at a room temperature closer to setpoint when the outdoor temperature is colder than would occur without the use of the modifier. The net effect is to maintain the room temperature closer to setpoint temperature than would otherwise occur under extremely cold outdoor conditions. On the other hand, when the system is operating in the cooling mode, the modifier also increases the target temperature in steps as the outdoor temperature increases by predetermined amounts in relation to the setpoint temperature. The net effect of this stepwise increasing modification is to cause the system to enter or remain in a lower state of cooling at higher room temperatures than might occur if the setpoint temperature were directly used for control purposes, thus improving system operating efficiency during periods of high outdoor temperature. This automatic adjustment of target temperature also has the advantage during periods of relatively cooler outdoor temperatures, such as occur during the night, of assuring that the heat pump system is operated periodically to assist in dehumidifying the indoor air thereby to enhance the feeling of coolness in the room.

The controller 48 in accordance with an important feature of the invention is adapted to control the change of the system from one heating state to another and from one cooling state to another in accordance with specific rules and upon the occurrence of certain prescribed conditions. With respect to changes between states, the controller 48 is provided with a preprogrammed operating state change criteria table comprised of a plurality of values of temperature differential between the actual room temperature and the desired temperature (setpoint or modified target temperature) at which operating state changes occur for the heat pump system. Employing, for example, the rules as previously described, the span of temperature differentials resulting in inter-state changes preferably is substantially greater, such as twice greater, than the span of temperature differentials resulting in intra-state changes. In the previously described rules, the preferred inter-state differential span is 0.5° C. and the intra-state span is 0.25° C. Inter-state changes, as the term is used herein, are changes occuring when initially entering the lowest operating state or when moving between operating states, in either the heat or cool mode, in the same direction, i.e. to a higher or lower state, as that of an immediately preceding state change. Intra-state changes, on the other hand, refer to those which occur when moving between adjacent operating states in a direction opposite to that of an immediately preceding state change, i.e. in effect a successive turning On and Off, or vice versa, of a given state. Controller 48 then responds to actual sensed temperature from sensor $T_7$ or to an averaged sensed temperature when multiple sensors $T_{7a}$-$T_{7b}$ are employed, to determine the temperature differential from setpoint or target temperature which is then compared with the criteria table to establish the operating state the heat pump should be in and, if appropriate, the direction of state change required to reach the indicated operating state.

In accordance with a further aspect of the invention, in addition to determining the appropriate operating state based on measured temperature differentials away from the desired setpoint or target temperature, controller 48 also operates to control the timing of the state changes to assure that the heat pump system does not needlessly enter an operating state that is higher in energy usage than is necessary to achieve the desired temperature condition within a reasonable preselected time period. For example, when in the heating mode, it has been found desirable to provide a lockout or inhibit time interval during which no heating state increase can occur after the system has performed an inter-state change to move into a given one of the lower heating states, i.e., states 1-3. In other words, once the system has entered into heating state 1, for example, an increase in heating capacity to state 2 is prohibited for a selected period of time. Likewise, once the system shifts into state 2 from state 1 or into state 3 from state 2, no further increase in state, i.e. inter-state change is permitted until such inhibit time period has expired. In the present example, a state increase inhibit time of 10 minutes is employed although the time period selected is largely a matter of choice. The purpose of such a state increase inhibit time is to allow the system to remain in a given heating state long enough so that measurement of room temperature at the beginning and end of the time period can be made to provide a fairly reliable means for determining initially whether room temperature will reach the target temperature within a reasonable preselected time period (60 minutes, for example) without the necessity of adding heating capacity, or whether a state increase will be required as this preselected time period progresses in order to reach the target temperature within this desired preselected time interval. The preselected time period for bringing room temperature up to target temperature is purely a matter of choice but should be of reasonable duration (45-60 minutes, for example) taking into consideration the many well known variable operating conditions under which the system can be expected to operate in a given heating season. Clearly, therefore, the energy efficiency of the system in terms of average monthly operating costs can be greatly improved by requiring the system to operate in the lowest state of the heating mode wherein target temperature can be reached in a reasonable period of time and thereafter maintained. Accordingly, the controller 48 is adapted to perform such an analysis, which is referred to herein by the expression "delta check", every 10 minutes during which the system is in any given one of the lower heating states 1-3 and the room temperature is below the temperature range which will satisfy the state it is in. Moreover, when the system switches into any one of the heating states 1-3, no further state increase is allowed until a first 10-minute state increase inhibit time interval has elapsed so that a first delta check can be made by the controller 48 to determine the necessity of a further increase in heating state. After the first 10-minute time interval has elapsed in a given heating state, and a state increase has been disallowed, additional 10 minute time intervals are initiated until the room temperature is within the range that will satisfy the state it is in.

TABLES III and IV are representative of delta check rules which have been applied through suitable programming of the microcomputer in controller 48 for determining when changes of state should be allowed in the heating and cooling modes respectively.

TABLE III

| HEATING MODE OPERATION | |
| --- | --- |
| Temperature Differential = Room Temp − Target Temp. | No State Increase if Room Temp. Increase is at Least - |
| −1.0° C. to −2.0° C. | 0.25° C./10 Min. |
| −2.0° C. to −3.0° C. | 0.50° C./10 Min. |
| −3.0° C. to −4.0° C. | 0.75° C./10 Min. |
| −4.0° C. to −5.0° C. | 1.00° C./10 Min. |
| −5.0° C. and below | 1.25° C./10 Min. |

TABLE IV

| COOLING MODE OPERATION | |
|---|---|
| Temperature Differential = Room Temp. − Target Temp. | No State Increase if Room Temp Decrease is at Least - |
| 1.0° C. to 2.0° C. | 0.25° C./10 Min. |
| 2.0° C. to 3.0° C. | 0.50° C./10 Min. |
| 3.0° C. to 4.0° C. | 0.75° C./10 Min. |
| 4.0° C. to 5.0° C. | 1.00° C./10 Min. |
| 5.0° C. and above | 1.25° C./10 Min. |

Figure 3:
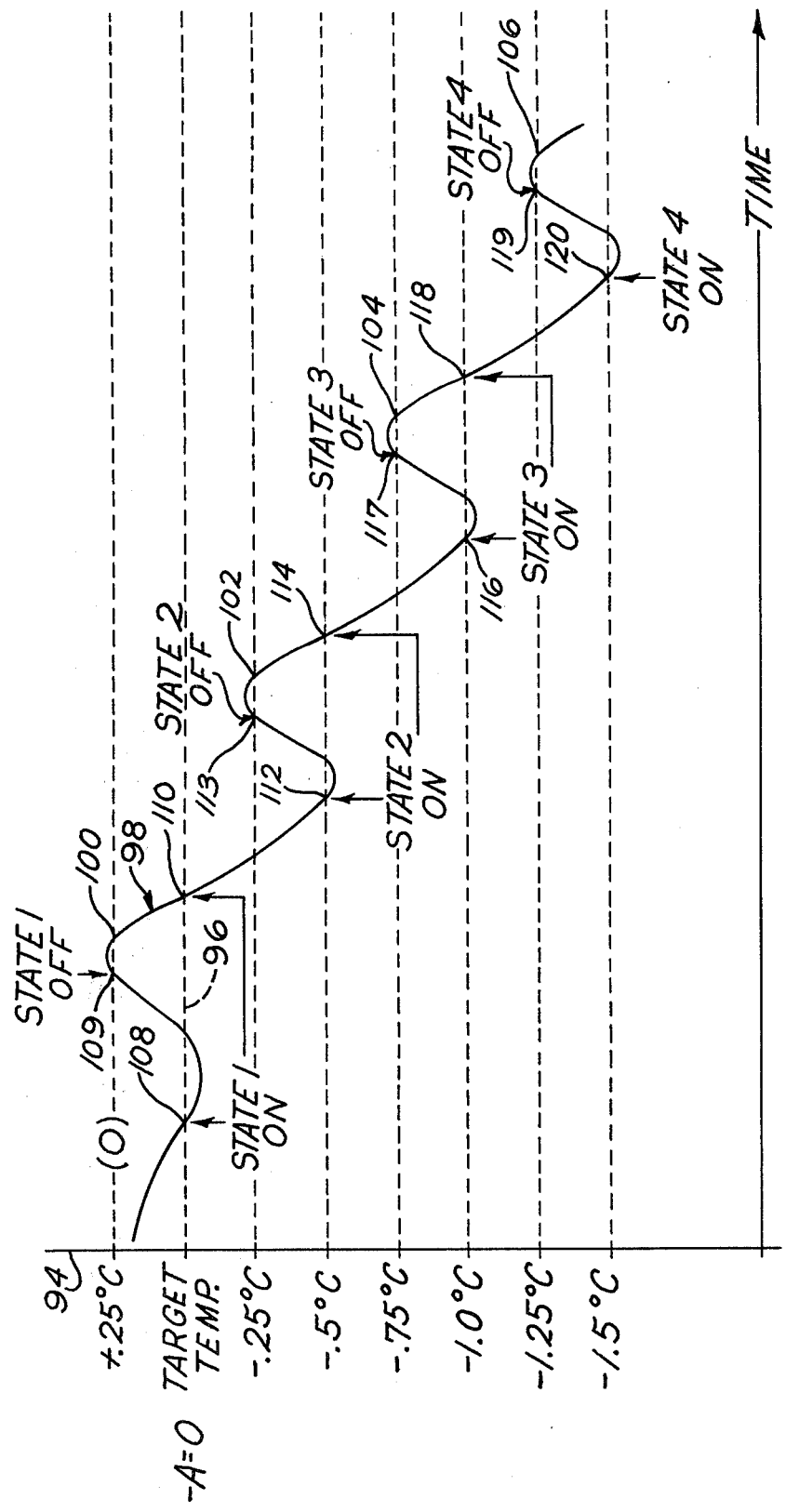
FIG. 3 shows a graph of variations in the temperature differential between target temperature and actual room or enclosed space temperature, referred to in the specification as differential temperature "A", resulting, in accordance with another aspect of the invention, from operation of the system of FIG. 1 in the heating mode and illustrating the effects of various heating state changes upon the differential temperature "A".

Referring now to FIG. 3, an example of the various heating state changes of the heat pump system based on temperature differential "A" away from a target temperature is graphically illustrated. The vertical axis 94 is calibrated in degrees centigrade above and below any desired target temperature, the latter being represented by a horizontal dashed line 96. A curve 98 illustrates room temperature changes relative to the target temperature line 96 as a function of time under the influence of environmental changes affecting room temperature and of various resulting state changes. It should be understood that curve 98 is hypothetically constructed to illustrate the principles of the invention involved in the state changes and does not necessarily represent the natural occurrence of an actual temperature variation in the compressed time period shown. Thus, assuming environmental conditions cause the room temperature to fall below the target temperature at point 108, the system of FIG. 1 enters State 1 to turn the compressor on at low speed. When the room temperature rises to point 109 which is above target temperature by the intra-state differential span of 0.25° C., the system turns State 1 Off until the room temperature falls below the target temperature at point 110 whereupon State 1 is re-entered. Assuming environmental conditions are such that the room temperature continues to fall through the inter-state temperature differential span of 0.5° C., i.e. to point 112 at an actual room temperature 0.5° C. below target temperature, the system then enters State 2 in which the compressor is changed to high speed operation to accelerate the heat exchange, i.e. heating effect of the system. When the room temperature rises through 0.25° C. intra-state temperature differential span to point 113, the system returns to State 1 until the room temperature subsequently falls to point 114 whereupon State 2 is re-entered. Similarly, continually falling room temperatures would result in inter-state changes to State 3 at point 116 and to State 4 at point 120 to add one or two supplemental resistance heaters as needed. Intra-state changes also occur at points 117 and 119.

Figure 4:
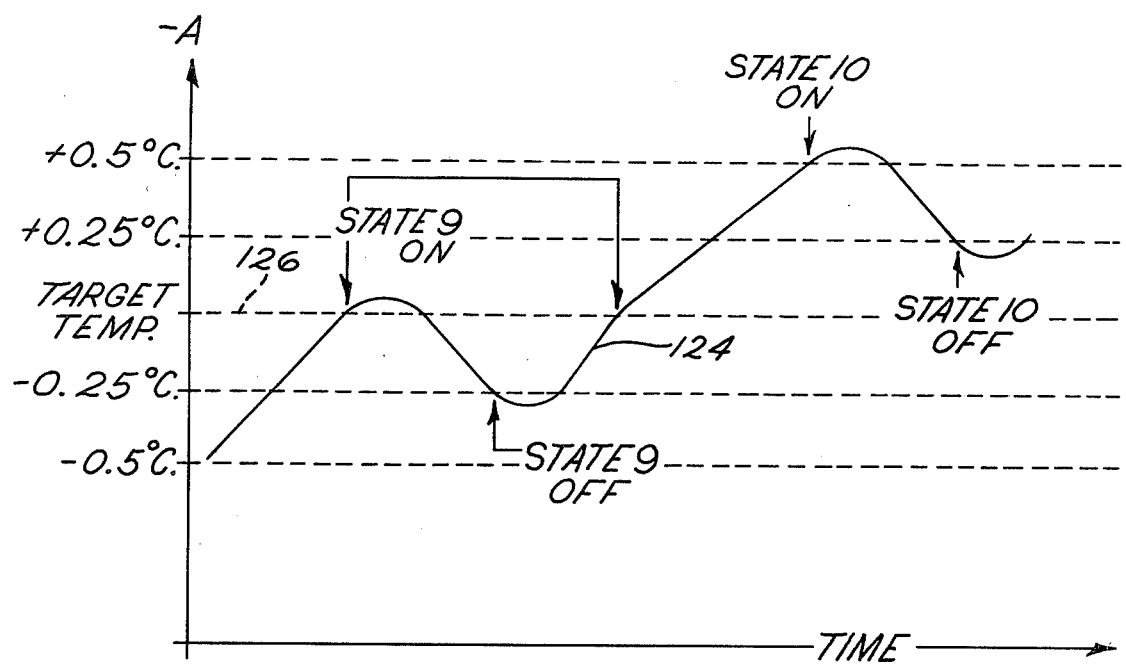
FIG. 4 shows a graph of variations in the differential temperature "A" resulting, in accordance with another aspect of the invention, from operation of the system of FIG. 1 in the cooling mode and illustrating effects of various cooling state changes upon the differential temperature "A".

FIG. 4 shows a specific example of cooling state changes wherein a curve 124 represents time varying changes in room temperature above and below any desired target temperature level represented by a dashed line 126 occurring with various cooling state changes over a period of time. An initial inter-state increase in cooling state from 8 to 9 occurs as the room temperature level increases above the target temperature level 126 while a further inter-state increase in cooling state from State 9 to State 10 occurs as room temperature rises to a level 0.5° C. above the target temperature. Intra-state decreases in cooling state are shown from State 10 to State 9 and from State 9 to State 8 which occur as room temperature reverses and falls to 0.25° C. above target and to 0.25° C. below target temperature, respectively.

Figure 5:
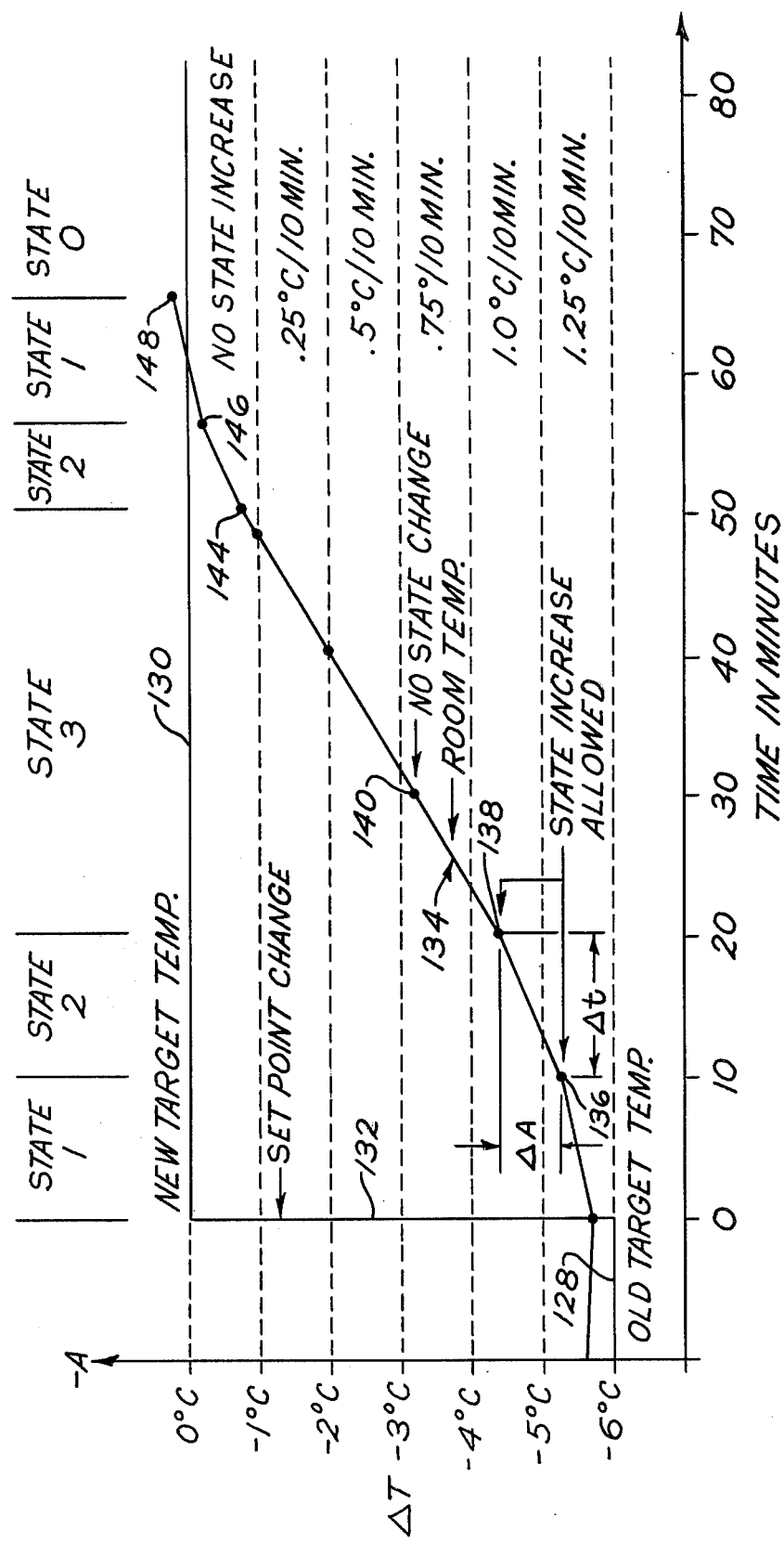
FIG. 5 shows a graph of representative reductions in the differential temperature "A" over a period of time resulting from implementation of the state change inhibit function, sometimes referred to herein as the "delta check" function, by the energy management means of the system of FIG. 1 which represents yet another feature of the present invention.

Referring now to FIG. 5, an operating profile for the system is shown which illustrates the operation of the delta check criterion as the system raises the average of the room temperatures $T_{7a}$, $T_{7b}$ during a 60 minute time interval following an abrupt increase of the target temperature from a first level 128 to a second level 130 6° C. higher than the first level 128. Such an abrupt change typically results from a user-inserted change in the set-point temperature or coming out of a preset setback period. Assume the increase in target temperature from the level 128 to the level 130 occurs at time zero as indicated by the vertical line 132. Assume also, for example, that at time zero, room temperature is 0.25° C. above the first target temperature level 128 so that immediately prior to the change in target temperature at time zero the system is in the Off heating state 0, i.e. the room temperature satisfies the first target temperature. Upon switching to the new target temperature level 130 at time zero, the room temperature is suddenly found to be some 5.75° C. below the new target temperature level 130 whereupon the system immediately switches into heating State 1. During the first 10 minute time interval following entry of the system into heating State 1, it will be assumed that the room temperature as indicated by the curve 134 rises relatively slowly. At the end of the first 10 minute interval, the curve 134 indicates a room temperature increase to −5.25° C. below new target 130 as at point 136. But note at the far right of FIG. 5 and in TABLE III that when room temperature (curve 134) is from −5° C. to −6° C. below target temperature 130, which is the case in the first 10 minute time interval of FIG. 5, the delta check criterion requires that the rise ΔA in the room temperature curve 134 must be at least 1.25° C. to prevent a state change from occurring at the first 10 minute point 136. Since a temperature increase ΔA of only 0.5° C. has occurred at this point in the example of FIG. 5, an increase of heating state from State 1 to State 2 results in order to accelerate the temperature rise during the next 10 minute period. Consequently, the operation of the delta check criterion has determined that if the original rate of temperature increase is allowed to continue, the new target temperature 130 will not be reached within the desired 60 minute time interval following the change in target temperature from level 128 to level 130, thereby requiring that the rate of temperature increase be accelerated by increasing the heating state of the heat pump system.

With the system now operating in State 2 during the second 10 minute time interval, the curve 134 shows a marked positive increase in slope as the higher heating capacity of State 2 increases the room temperature over the second 10 minute time interval at a greater rate. At the 20 minute point 138 the system has completed a first 10 minute period of operation in State 2, whereupon application of the delta check criterion in controller 48 determines whether an additional increase in heating state is required in order to bring the room temperature up to target temperature level 130 in the desired 60 minute interval. Note at the 20 minute point 138 that room temperature has increased during the second 10 minute interval by slightly less than 1.0° C. Since room temperature at the 20 minute point 138 is between 4 and 5 degrees C. below the target temperature 130, the applicable delta check criterion shown at the right of the graph indicates that a room temperature increase of at least 1.° C./10 minutes is required if target level 130 is to be reached in approximately 60 minutes from time zero. Therefore, since this minimum condition is not satisfied at the 20-minute point 138, a further state increase from State 2 to State 3 in enabled. As the result of the increase from State 2 to State 3 at the 20-minute point, the slope of the curve 134 increases further so that, during the third 10-minute time interval ending at the point 140, room temperature has risen by more than 1.0° C. The room temperature at the 30-minute point 140 is slightly more than 3 degrees C. below the target 130 (between 3° or 4° C. below target), and the applicable delta check criterion at this temperature differential indicates that only a 0.75° C. temperature increase is required during the immediately preceding time interval. Since the system has thus met this minimum rate of temperature rise requirement, it is clear that a continuing similar rate of room temperature increase will be sufficient to reach target temperature 130 within the 60-minute interval desired so that no further state increase occurs. Moreover, since the actual temperature is still more than 3° C. below the target temperature, then, according to the aforementioned state change criteria, as illustrated in the graph of FIG. 3, no reduction in state is called for and the system therefore remains in State 3 after reaching the 30-minute point 140. In a similar vein, during the fourth time interval between 30 and 40 minutes from time zero, the temperature rises at a sufficient rate to satisfy the applicable delta check criterion and no state increase is required. Also, the temperature is still far enough below target temperature to prevent a reduction in state. The system therefore remains in State 3 until it reaches point 144 at which time the temperature is 0.75° C. below the target level 130. At this point, the aforementioned rules as illustrated in the FIG. 3 graph causes controller 48 to switch the system down in state from State 3 to State 2. Going down in state can occur at any time as long as the minimum time in a state has been satisfied as stated in the state change rules criteria. This action slows the heating rate of the system as the room temperature approaches the new target 130 so as to reduce the tendency of the system to cause the room temperature to overshoot the target level 130. Since the room temperature is now within the range of control of the state that it is in, the delta check criterion is not used anymore. At point 146, about 56 minutes, the room temperature has increased to within 0.25° C. of the target 130 so that the controller 48 switches the system further downward in heating capacity from State 2 to State 1 (FIG. 3). State 1 heating thereafter continues until the room temperature rises to 0.25° C. above the target level 130 at which point 148 the system enters off heating State 0. Note in the example of FIG. 5 that the target temperature level 130 was reached by the curve 134 at approximately 60 minutes from the target temperature change 132.

Figure 6:
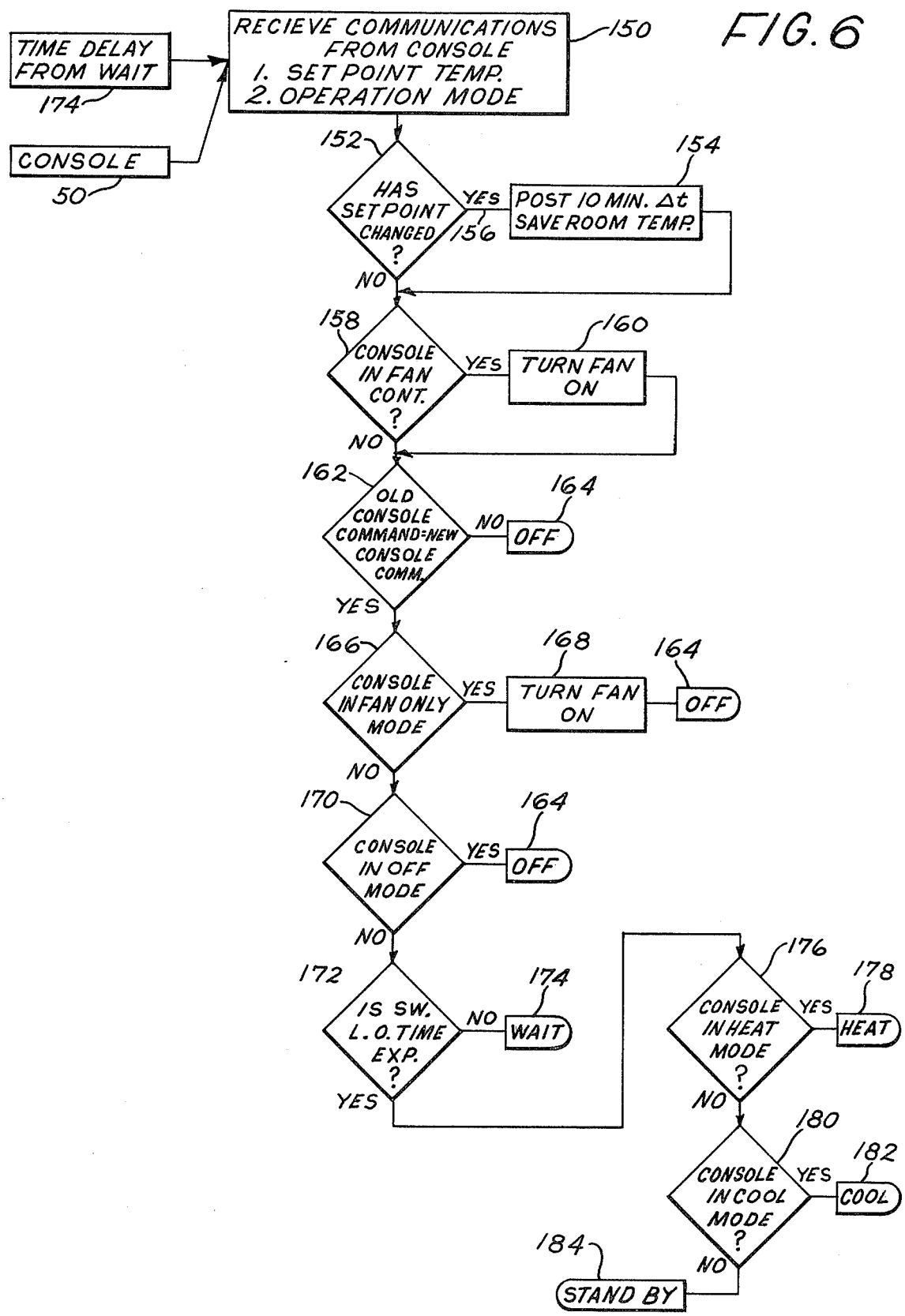
FIG. 6 shows a block diagram or flow chart of the main control program of the energy management means of the system of FIG. 1.

Referring now to FIG. 6, a program flow chart for realization of overall control of the energy management features of the heat pump in accordance with the invention will now be explained. Initially, the controller 48 communicates with the console 50 and receives manually entered data from the latter, namely, operating mode and setpoint temperature information as at block 150. Next, inquiry is made, as at block 152, as to whether the setpoint temperature has been changed since a previous execution of this logic. If YES, then the controller 48 posts a 10-minute countdown time interval in clock circuitry and stores the average of room temperature readings $T_{7a}$, $T_{7b}$ in memory as at block 154. This initiates the delta check. In either case, the controller 48 next inquires, as at block 158, whether the console 50 has been placed in the Fan Continuous mode, meaning that the operator intends to run the indoor fan 40 (FIG. 1) continuously. If YES, the controller 48 causes the relay 66 to be energized as at block 160 whereas, if NO, this step is bypassed. In either event, the controller 48 next inquires as at block 162 whether the mode instruction from console 50 is the same as existed during the previous execution of this process. If NO, the controller 48 branches to OFF as the block 164 wherein it executes the logic of FIG. 10 as later explained, whereas, if YES, inquiry is made, as at block 166, whether the console 50 has been placed in the "Fan Only" mode. If YES, the relay 66 is energized to turn the indoor fan 40 ON as at block 168 after which the controller 48 again branches to OFF as at 164, whereas, if NO, inquiry is made as at block 170 whether the console 50 has been placed in the OFF mode. If YES, the controller 48 branches to the OFF process as at block 164, whereas, if NO, inquiry is made at block 172 whether a switch lockout time has expired. The switch lockout time is a selected minimum time period, such as 6 seconds for example, during which no change in the condition of the loads will be allowed. Such a lockout is desired to eliminate rapid cycling between states caused by rapid changes back and forth between different selected modes at the console 50. Such a situation is envisioned wherein a child might playfully attempt numerous random changes in the setpoint by successively depressing various keys on the console 50. If the preselected switch lockout time has not expired, then the controller 48 branches to "wait" as at block 174 preparatory to recycling through the process as at block 150, whereas if the inquiry at block 172 results in a YES determination, the controller 48 proceeds to inquire as at block 176 whether the console 50 is in the Heat mode. If YES, the controller 48 branches to the execution of the heat program of FIG. 7 as at block 178 in FIG. 6 whereas, if NO, the controller 48 inquires whether the console 50 is in the Cool mode as at block 180. If YES, the controller 48 branches to the cooling program of FIG. 8 as at block 182 in FIG. 6 whereas, if NO, the controller 48 branches to STANDBY as at block 184. The STANDBY program is more fully defined in the aforementioned copending application Ser. No. 196,413.

Figure 7:
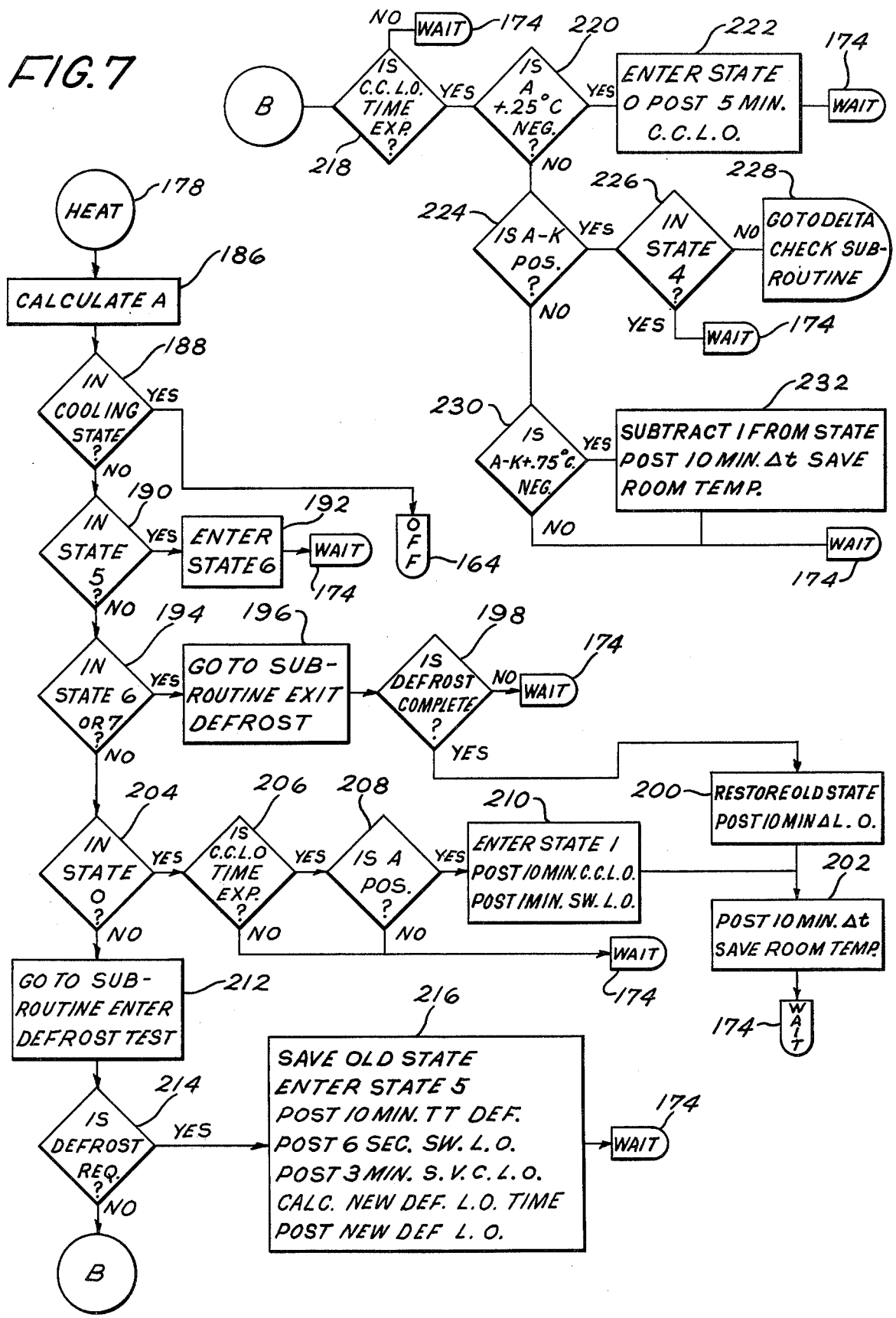
FIGS. 7 and 8 show block diagrams or flow charts for the heating and cooling mode programs, respectively, of the energy management means of the system of FIG. 1.

Having thus described the sequence of the main program of the controller 48, the heating program of FIG. 7 will now be described. Assume that the controller 48 has branched in the main program of FIG. 6 to "heat" as at block 178, thus entering the process of FIG. 7 as indicated. First, the temperature differential "A" is calculated as at block 186 by determining the setpoint temperature $T_S$ entered at the console 50, adding the outdoor temperature dependent modifier thereto according to TABLE II to obtain the target temperature, and subtracting therefrom the average indoor temperature $T_{7a}$, $T_{7b}$. As previously explained, the resulting quantity "A" is therefore the error to be corrected by the system between the target temperature and the average indoor temperature. Next, the controller 48 inquires as at block 188 whether the controller 48 is in a cooling State 8-10 which, if YES, results in a branch to OFF, as at block 164, while if NO, results in a branch to inquiry block 190 wherein the controller 48 determines whether the system is in State 5 (the transitional state entered from any one of the four heating states on the way to the lowest defrost State 6 according to FIG. 2). If YES, after the required 6-second delay in State 5 which uses the switch lockout to accomplish, the controller 48 switches the system to defrost State 6 as at block 192 and branches to "Wait" as at block 174 preparatory to re-entering the main program of FIG. 6. If not in State 5, the controller 48 inquires as at block 194 whether the system is in either of the defrost States 6 or 7. If YES, the controller 48 branches to an exit defrost subroutine as at block 196 after which inquiry is made as at block 198 whether defrosting operations are complete. If NO, the controller 48 branches to "Wait" as at block 174 to re-enter the main program of FIG. 6, whereas, if YES, the controller 48 branches to block 200 wherein the heating state which the system was in immediately prior to entry into defrost State 5 is restored and wherein a 10-minute inhibit or lockout time is posted, entering the delta check routine to allow the system to stabilize after defrost. Thereafter, as at block 202, a new 10-minute time period for the delta check function is posted, the averaged room temperature $T_{7a}$, $T_{7b}$ at the commencement of that 10-minute period is stored in memory and the controller 48 branches to "Wait" as at block 174.

Returning now to inquiry block 194, if the system is not in either of the defrost States 6 or 7, the controller 48 proceeds to inquire as at block 204 whether the system is in the OFF heating State 0 which, if YES, produces a branch to inquiry block 206 wherein inquiry is made as to whether state increase lockout time has expired. This state increase lockout insures that the compressor has been OFF for at least 5 minutes to allow internal pressure to equalize. If NO, the controller branches to "Wait" as at block 174 whereas, if YES, the determination is made as at block 208 whether temperature differential "A" is positive, meaning whether the averaged room temperature $T_{7a}$, $T_{7b}$ is below the target temperature. If NO, then room temperature satisfies the target temperature and a branch occurs to wait block 174 whereas, if YES, then the system is switched to the initial heating State 1, a new 10-minute state increase lockout time is posted and a one-minute switch lockout is posted to hold the compressor in the low speed heating mode of operation for at least that minimum time period, all as at block 210. The effect is to keep the system from entering defrost and switching to high speed until at least one minute of operation at low speed has occurred, after which the controller 48 branches to block 202 for further processing as previously explained.

Returning now to inquiry block 204, if the controller 48 determines that the system is not in State 0, it branches to an "enter defrost" subroutine as at block 212 where certain tests are performed to determine if defrosting of the outdoor coil 14 is required. This process is described in detail in the aforementioned copending application Ser. No. 196,411. If a defrosting operation is required, the controller 48 branches as at block 214 to block 216 wherein the following actions are taken. The heating state in which the system was operating immediately prior to entry into defrost State 5 ("old state") is stored in memory, the system is switched into State 5 according to the requirements of TABLE I for that state, a 10-minute maximum time to stay in the defrosting operation is posted and countdown is begun, a 6-second switch lockout is posted during which time the system is locked into State 5 as previously explained, a defrost lockout time is calculated and posted for controlling the defrosting operation as set forth in the aforementioned copending application, after all of which the controller 48 goes to wait block 174.

Returning now to inquiry block 214, if defrost is not required at that time, the controller 48 branches at the circle labeled "B" to inquiry block 218 to determine whether the state change lockout time has expired. This time is 10 minutes upon entering a compressor ON state and 5 minutes upon entering a resistance heat state or an OFF state. If NO, the system waits as at block 174 whereas, if YES, the controller 48 inquires as at block 220 whether the value A+0.25° C. is negative, i.e. whether the differential or error temperature (the difference between target and room temperature) is a negative quantity by more than 0.25° C. If the answer is YES, this means that the room temperature is more than 0.25° C. above the target temperature, wherein the target temperature is more than satisfied, whereupon the controller 48 enters OFF heating State 0 and posts a 5-minute state change lockout time during which time re-entry into State 1 will not be permitted, all as at block 222, and thereafter goes to wait block 174. If, on the other hand, the room temperature is not greater than the target temperature by more than 0.25° C. as a result of the determination as at block 220, the controller 48 branches to inquiry block 224 to determine whether the error "A" is greater than the current system state level (either 1-4) multiplied by 0.5° C., denoted as "K" in the flow chart. This inquiry is made preparatory to determining whether a heating state increase or decrease should be made. If YES, inquiry is made as at block 226 whether the system is currently in heating State 4 as indicated by the condition of the components of FIG. 1 under Column 4 of TABLE I. If YES, then since no further state increase is possible above State 4 in the present example, the controller branches to wait block 174. If NO, the controller 48 branches to the delta check subroutine of FIG. 9 as at block 228.

Returning to inquiry block 224, if the value of A-K is not positive, meaning that A-K is not greater than zero, the controller 48 branches to inquiry block 230 and determines whether A-K is less than 0.75° C. If NO, the controller 48 branches to wait block 174, whereas if YES, the controller 48 reduces the heating state of the system according to the rules of TABLE 1, posts a new 10-minute state increase lockout time, stores the room temperature existing at the beginning of this 10-minute period in memory, all as at block 232, and goes to wait block 174.

Figure 8:
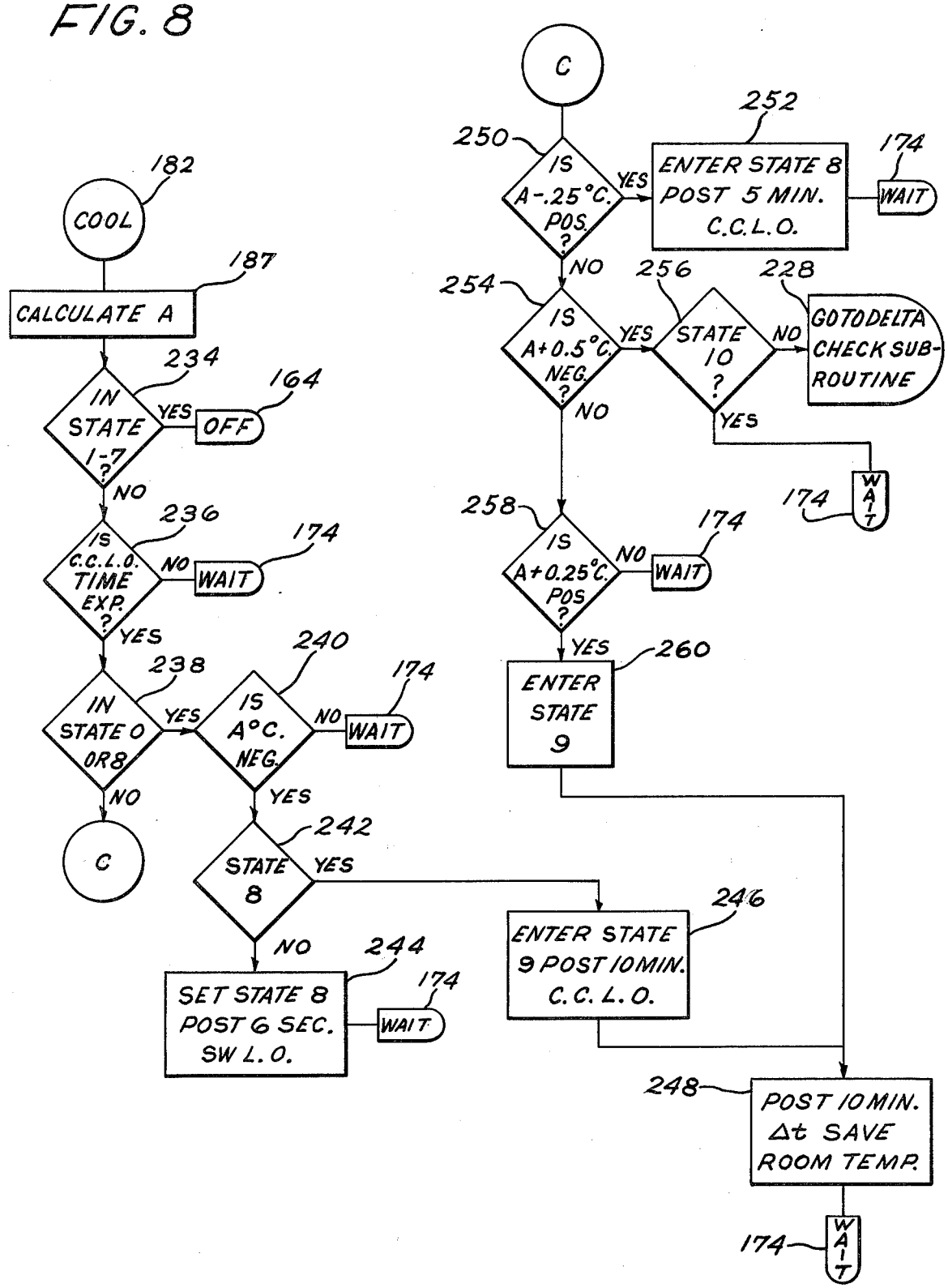

Thus, having described the heating process executed by the controller 48 according to the flow diagram of FIG. 7, the controller cooling process of FIG. 8 will now be explained. Assume initially that the main program of FIG. 6 has been in the process of execution and that a branch has occured at inquiry block 180 indicating the the console 50 is in the cooling mode. The controller 48 thereupon branches from the main program of FIG. 6 to the cooling program of FIG. 8 as at block 182 of both figures. Referring now to the cooling program of FIG. 8, the error temperature "A" is calculated as at block 187 in the same manner as is done in the heating program of FIG. 7 at block 186 except that the setpoint temperature modifier employed will be that indicated in TABLE II for cooling rather than for heating mode operation.

Next, the controller inquires as at block 234 whether the system is in any one of States 1 through 7, i.e. any one of the heating or defrost states. If YES, the controller 48 branches to the OFF program of FIG. 10 as at block 164, whereas if NO, inquiry is made as at block 236 whether a state change lockout time has expired to thus allow a state increase. If NO, the controller 48 branches to wait block 174 preparatory to re-entry into the main program of FIG. 6 whereas, if YES, inquiry is made as at block 238 whether the system is in either the OFF heating or cooling state according to the requirements of TABLE I. If YES, inquiry is made as at block 240 whether room temperature is greater than the target temperature. If NO, the controller 48 branches to wait block 174 since the target temperature is then deemed to be essentially satisfied whereas, if YES, then cooling action will be required whereupon the controller branches to inquiry block 242 to determine specifically whether the system is presently in OFF cooling State 8. Remember that it has already been determined as at block 238 that the system is in one of the two OFF States 0 or 8. If the answer at inquiry block 242 is NO, the controller 48 places the system in State 8 and posts a 6-second switch lockout time to give the switchover valve 16 time to switch, all as indicated at block 244, and thereafter proceeds to wait as at block 174 preparatory to re-entry into the main program of FIG. 6. If the answer at the inquiry block 242 is YES, the controller 48 switches the system to cooling State 9 and posts a 10-minute state change lockout time, all as at block 246, then posts a 10-minute countdown time for the delta check function and stores the average room temperature $T_7$ existing at the beginning of the 10-minute countdown interval, all as at block 248, and then proceeds to wait as at block 174 before re-entering the main program of FIG. 6.

Returning to inquiry block 238, should the system not be found in either OFF state 0 or 8, the controller 48 branches as at the circle marked "C" to inquire as at block 250 whether the error temperature A−0.25° C. is positive, meaning whether room temperature $T_7$ is below the target temperature by more than 0.25° C. If YES, then since the room temperature is essentially satisfied, the controller 48 switches the system to OFF cooling State 8 and posts a 5-minute state increase lockout time, as at block 252, preparatory to re-entering the main program of FIG. 6 as at wait block 174. If NO, meaning that the target temperature is not satisfied, the controller branches from block 250 to inquire as at block 254 whether room temperature is greater than target temperature by more than 0.5° C. If YES, controller 48 branches to block 256 to inquire whether the system is already in the highest cooling state, State 10, which if YES, requires branching back to the main program of FIG. 6 as at wait block 174 since no increase in cooling capacity beyond State 10 is possible in the system of the present example. If NO, controller 48 branches from inquiry block 256 to the delta check subroutine of FIG. 9, as at block 228 in FIGS. 8 and 9, to determine if a further cooling state increase should be made.

Returning now to inquiry block 254, had the answer been NO, meaning that the target temperature is satisfied sufficiently that State 10 cooling capacity is not required, controller 48 branches to inquiry block 258 to determine whether target temperature less room temperature plus 0.25° C. is a positive number, which if NO, means that the target temperature is not yet satisfied and the controller must remain in State 10 whereupon controller 48 branches to wait block 174. if the answer is YES at block 258, then controller 48 switches the system to cooling State 9 as at block 260 and proceeds to block 248 as previously explained.

Having thus explained the heating and cooling programs of FIGS. 7–8 respectively, the delta check function of the system of the present example will now be explained with reference to FIG. 9. Assume initially that the delta check subroutine of FIG. 9 has been entered as at the circle marked 228 from either the heating or cooling program of FIGS. 7 or 8. The controller 48 first inquires as at block 262 whether a 10-minute delta check lockout time has expired since the last exit from defrost. If NO, controller 48 branches along a line 264 to bypass the remainder of the program to block 266 wherein a new 10-minute delta check countdown time is posted and the averaged room temperature $T_{7a}$, $T_{7b}$ at that time is stored in memory for use upon the next entry into the delta check subroutine, after which controller 48 returns to wait block 174. If inquiry at block 262 is YES, then the controller 48 proceeds to inquire as at block 268 whether a 10-minute time period has expired since the last delta check. If NO, the controller 48 exits to wait block 174, while if YES, controller 48 proceeds to calculate the difference in room temperature at the beginning and end of the 10-minute period just expired as at block 270. Thereafter, inquiry is made, as at block 272, as to whether the console 50 is in the cooling mode which, if YES, will result in a change in sign of the room temperature difference just previously calculated and the addition of error temperature "A" thereto, all as at block 274. If inquiry at block 272 results in a NO determination, the function at block 274 is bypassed. In either case, however, controller 48 next proceeds to determine the minimum room temperature difference required for the present error temperature "A" according to the rules set forth in FIG. 5 as previously explained, all as at block 276. The usual digital table lookup techniques may be employed for this purpose. Next, controller 48 inquires as at block 278 whether the required minimum room temperature change over the last 10 minutes for the present error temperature, according to the tabulation in the right hand margin of FIG. 5, has not been met by the actual room temperature change over the last 10 minutes, i.e. whether the minimum required temperature change for the present error temperature "A" is greater than the actual room temperature change over the same time period. If YES, controller 48 branches to block 280 wherein the state is increased to the next higher level after which inquiry is made as at block 282 as to whether the system is in State 2 or 10. If the inquiry at block 282 is NO, a 5-minute state change lockout time is posted in memory as at block 284 whereas, if YES, a 10-minute state change lockout time is posted in memory as at block 286. In either event, controller 48 thereafter proceeds to block 266 for further processing as previously explained. Returning now to inquiry block 278, if the determination is NO, meaning that the actual room temperature change over the last 10 minutes is at least equal to the required minimum temperature change for the present error temperature, then no state increase will be required whereupon controller 48 bypasses blocks 280-286 and proceeds to block 266 for out-processing from the delta check subroutine as previously explained.

Referring now to FIG. 10, the OFF program of controller 48 will now be explained. Assume initially that controller 48 has branched to OFF block 164 from either the main program, the heating program or the cooling program of FIGS. 6, 7 or 8, respectively. Inquiry is made as at block 288 whether the system is in either of OFF States 0 or 8 which, if NO, causes controller 48 to post a 5-minute state change lockout time, as at block 290. If YES, block 290 is bypassed. In either event, controller 48 next switches the system to State 0, posts a 16-second switch lockout time in memory during which time the switchover valve 16 can not be altered, and posts a 20-minute defrost lockout time in memory during the countdown of which entry into defrost State 5 will not be permitted, all as at block 292, whereupon controller 48 exits the OFF program as at wait block 174 preparatory to re-entry into the main program of FIG. 6.

Figure 11A:
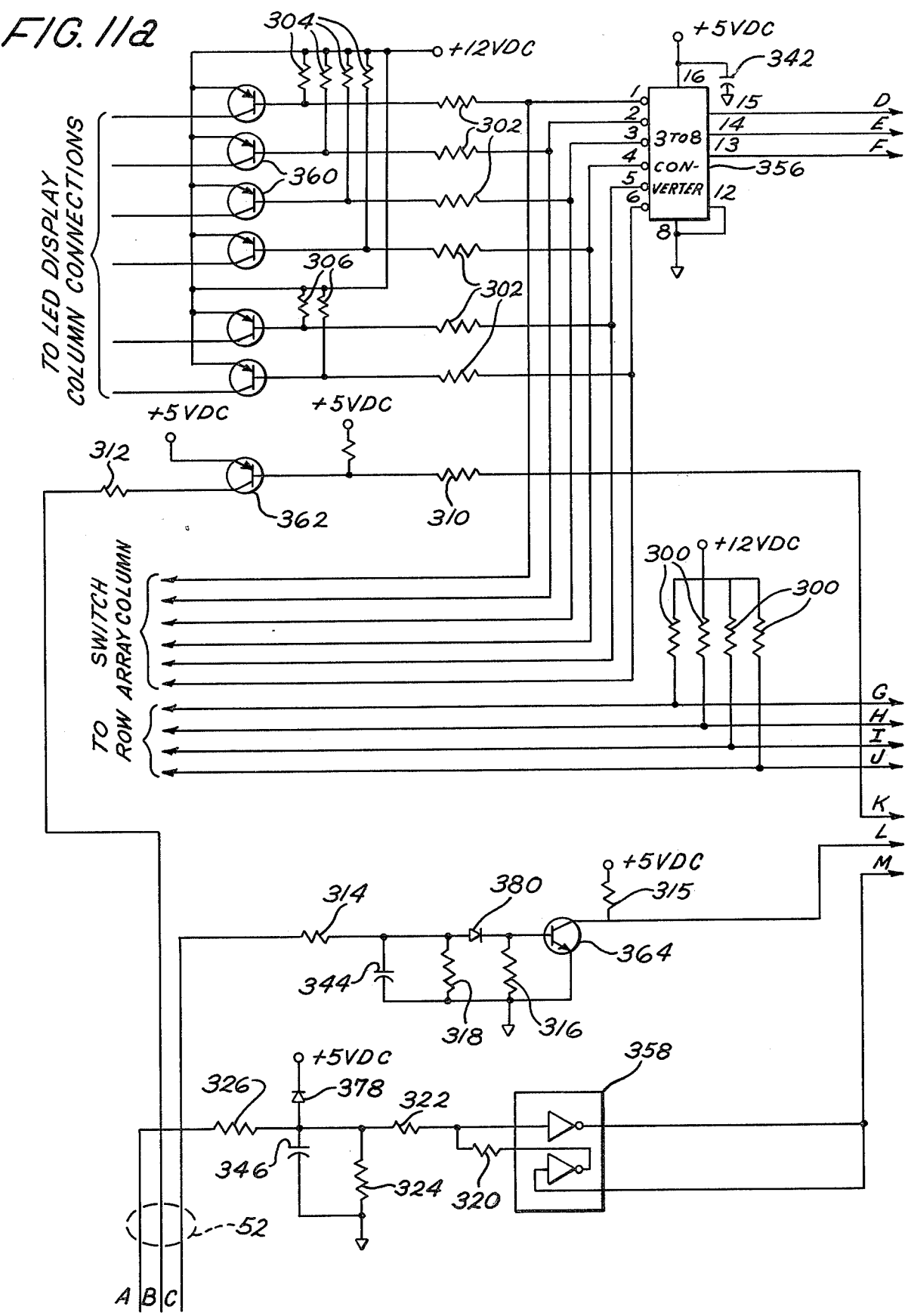
FIGS. 11a,b in combination show a schematic diagram of an electronic microprocessor for structural realization of the console portion of the energy management means of the system of FIG. 1.
Figure 12A:
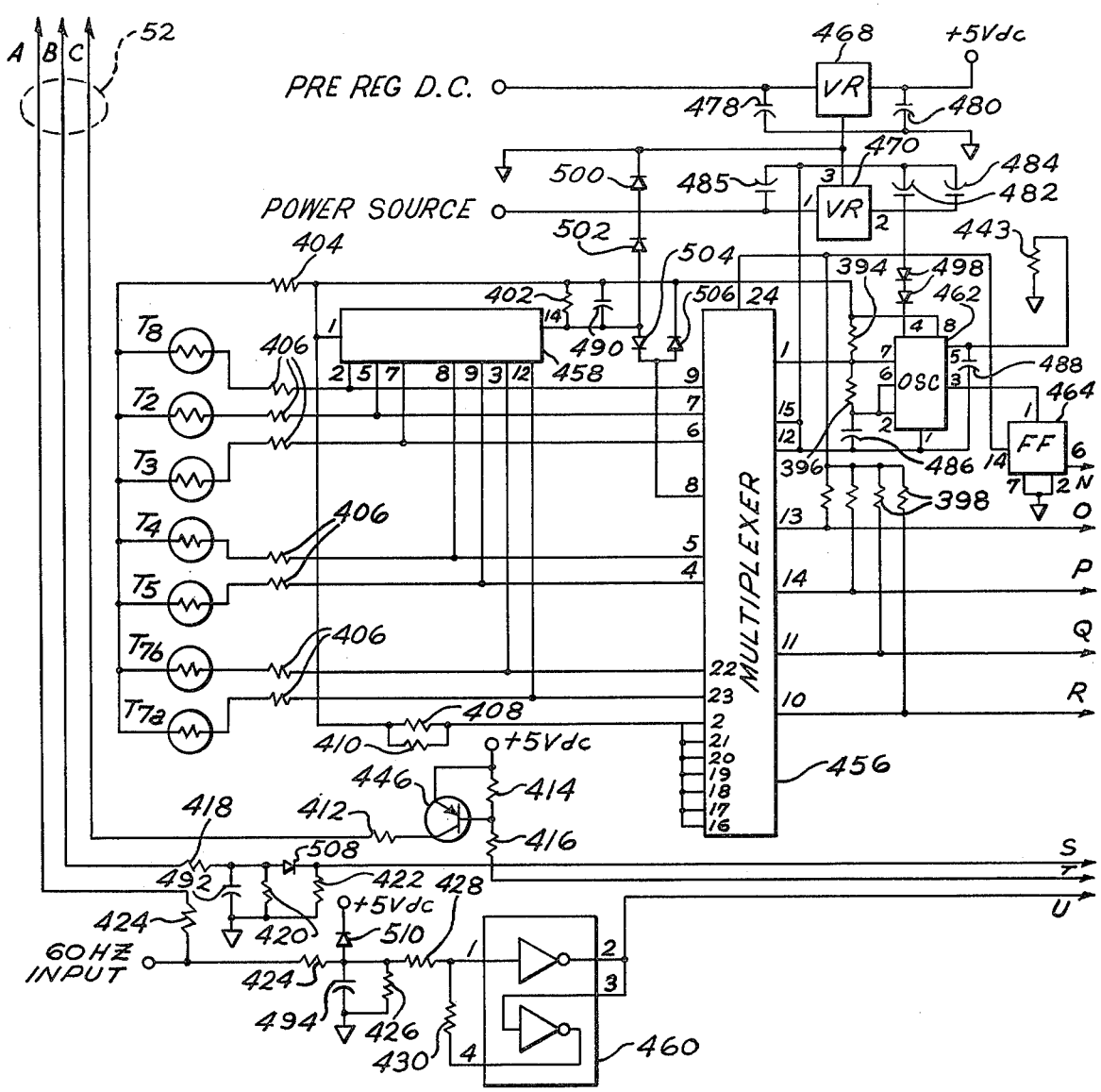
FIGS. 12a,b in combination show a schematic diagram of an electronic microprocessor for structural realization of the controller portion of the energy management means of the system of FIG. 1.

A suitable electronic circuit for the structural realization of console 50 which is programmable for the communication of operating mode, setpoint temperature and other information to controller 48, as previously explained, is shown in FIGS. 11a, b. A suitable electronic circuit for the structural realization of controller 48 of FIG. 1 which is programmable according to the rules and logic of FIGS. 6–10, as previously explained, is shown in FIGS. 12a, b. The processor circuitry of console 50 as shown in FIG. 11a is connected to the processor circuitry of controller 48 as shown in FIG. 12a by means of match lines A, B, C, the group of which also constitutes the cable or harness 52 between console 50 and controller 48 of FIG. 1. The remaining match lines marked D-M in FIG. 11a are connected to the correspondingly lettered match lines of FIG. 11b. In FIG. 12a, the match lines marked N-U connect to the correspondingly marked match lines of FIG. 12b.

Referring now specifically to FIGS. 11a, 11b, system console 50 is shown as including first and second microprocessor circuits 354, 352 which are programmable to process the user-inserted data as well as data received from controller 48 as will be described. Processor 354 is programmed to, among other things, provide a series of binary signals at output terminals 35-37 which are converted by a 3-to-8 converter circuit 356 to provide on output terminal 1-6 a sequential series of six strobe signals which are then coupled through protective coupling resistors 302 to the base inputs of current amplifier transistors 360. The collector outputs of transistors 360 are then connected by suitable means to the column driving connections of a conventional LED display matrix (not shown). At suitable times in the program cycle, LED row drive signals are provided from output terminals 8-15 of processor 354 to the inputs of driver transistors 348 where they are current amplified and connected in appropriate manner to the LED display matrix. The particular display (e.g. temperature, time, etc.) generated by the LED display matrix is thus a function of the coincidence of current drives applied to selected light emitted diode in the display matrix in accordance with instructions generated in processor 354.

The strobe signals at output terminals 1-6 of 3-to-8 converter 356 are also connected in known manner to the column connections of a conventional membrane switch array (not shown). Depending on which switches in the array are closed by the user, suitable conditioning signals are then sent back to input terminals 30-33 of processor 354 thus providing user-inserted control data to processor 354.

The user-inserted data is stored within processor 354 for continuous or preselected use during program operations within console 50. In addition, the data may be transferred on one or more of the lines connecting terminals 3-6 and 16-19 of processors 354 and 352 to interactive processing with data and instructions received from controller 48 at input terminal 26 of processor 352. In an actually constructed embodiment of the present invention, the two processors 354 and 352 were employed principally to provide adequate processing memory capacity although it will be appreciated that with other forms of processors having greater memory capacity a single processor might be employed in the console 50.

Data of a volatile nature, e.g. user-inserted or otherwise changeable data, is also shown as being stored in a separate CMOS random access memory 350 which is provided with alternative power sources via diodes 376 and 374. When the normal 5 volt DC source from diode 376 is lost, as by temporary power loss to the home in which the system is installed, back-up power is provided by a suitable battery via diode 374 to retain the volatile data stored in the memory 350. A special data check core signal may be stored in memory 350 to serve as an indication of the validity or invalidity of the stored data after power is restored so as to avoid inadvertent incorrect operation of the heat pump system.

As previously noted, console 50 is normally located in the structure where the air space is to be conditioned, while the controller 48 is normally located in a convenient storage location remote from console 50. It is, therefore, necessary to provide for data communication between console 50 and controller 48. In the case of communication from console 50 to controller 48, this is accomplished by an output circuit leading from output terminal 27 of processor 352 through amplifier transistor 362 and line B of cable 52 to input resistor 418 of controller 48 (FIG. 12a). Conversely, data signals from controller 48 are received on line C of cable 52 and are applied to data input terminal 26 of processor 352 via amplifier transistor 364. Accurate control of the timing and synchronization of the program processes occurring in console 50 and controller 48 is provided by means of a 60 Hz interrupt signal which is applied to input terminals 38 of both processors via line A of cable 52.

Figure 12B:
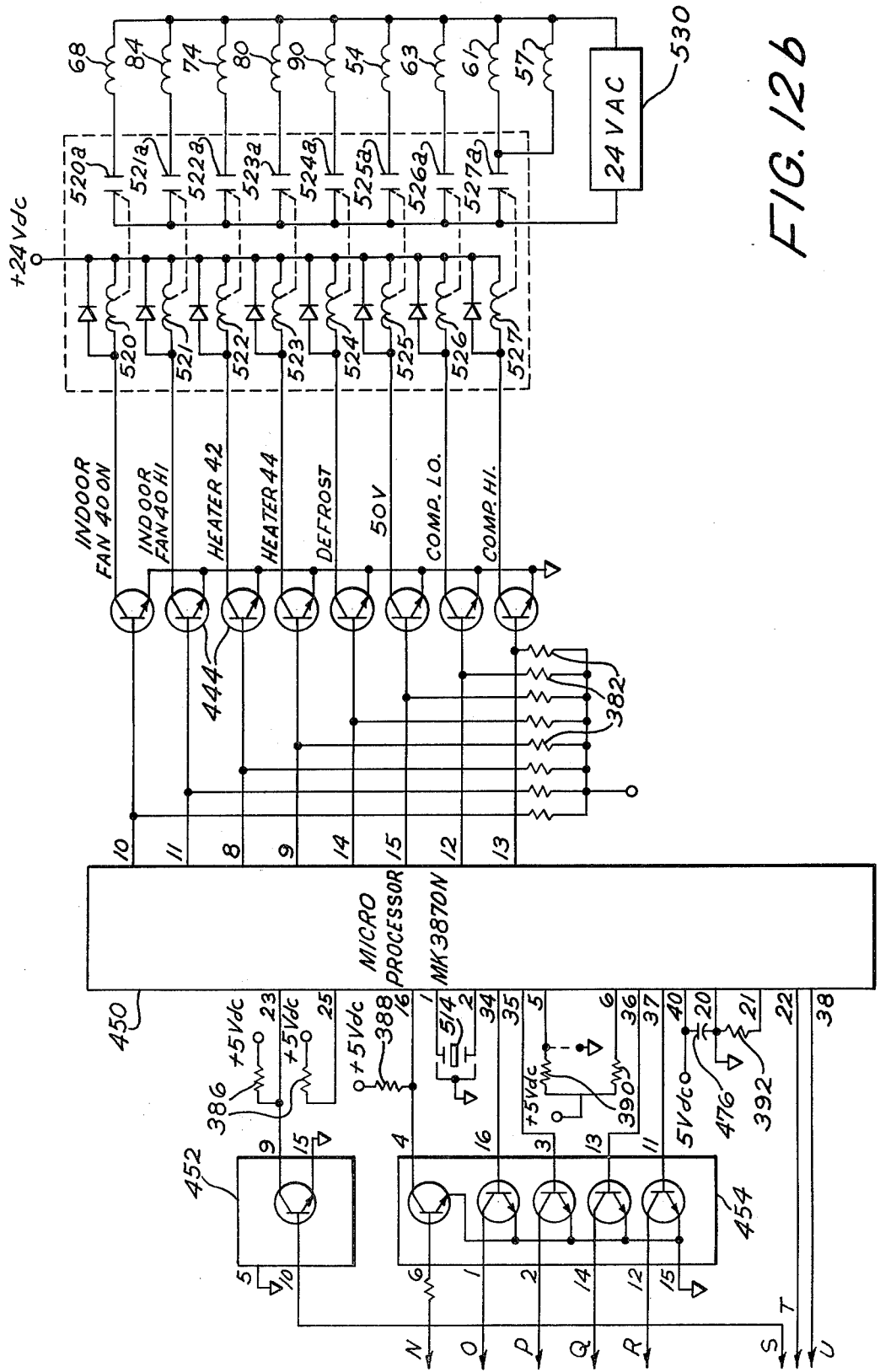

Considering now the system controller 48 shown in FIGS. 12a and 12b, temperature data, as sensed by thermistors $T_2$-$T_5$, $T_{7a}$, $T_{7b}$, and $T_8$, is read into processor 450 in the following manner. Timing control signals on output terminals 34-37 of microprocessor 450 are coupled through buffer amplifiers contained within integrated circuit 454 to input terminals 10, 11, 13, 14 of multiplexer 456 where they are suitably multiplexed with terminals 4-9, 22 and 23 to connect the thermistors, in sequence, with output terminal 1 of multiplexer 456. As the output of each thermistor appears in sequence on multiplexer terminal 1, it is coupled to the junction of resistors 394 and 396 at input terminal 7 of oscillator circuit 462. Resistors 404 and 394 are included in circuit with each of the thermistors so as to tend to linearize the otherwise highly non-linear resistance versus temperature characteristics of each of the thermistors. The resistance network of the selected thermistor and resistors 406, 404, 394 and 396 in combination with capacitor 486 act to control the oscillation frequency of oscillator 462 to provide at oscillator output terminal 3 a repetitive signal, the frequency of which is representative of the temperature being sensed by the thermistor in question. This repetitive signal is applied to a "divide-by-sixteen" flip flop 464 to reduce the temperature signal frequency to a frequency range which is suitable for use by processor 450. In this manner, oscillator 462 may be operated at a relatively higher frequency thus enabling capacitor 486 to be reasonably small in value.

The temperature signal is then applied through a buffer amplifier contained in integrated circuit 454 to input terminal 16 of processor 450 where the period of the signal frequency is monitored and converted to the corresponding temperature value. To accomplish this, processor 450 executes a preprogrammed subroutine to count the number of pre-established time increments between the leading and lagging edges of each half cycle of the square wave appearing at the output of flip flop 464. This number is then compared by another subroutine in processor 450 to a "temperature" table in its read only memory (ROM) to determine the temperature being sensed by the thermistor in question. By suitably programming this number table into the ROM of processor 450, a further linearization of the thermistor is obtained.

The aforementioned 60 Hz interrupt signal is applied to input terminal 38 of processor 450 and is used to initiate the operation of the main program described in connection with the flow diagram of FIG. 6. Actual electrical control of the heat pump functional components is accomplished from output terminals 8-15 of processor 450 which are connected, respectively, to 24 volt relay coils 520–527. These relay coils are included in controller 48 and their respective contacts 520a–527a are connected in conventional manner via a 24 VAC source 530 to the functional power control relays described in connection with FIG. 1. For convenience, the contacts of "Hi Comp." relay 527 in controller 48 are connected in common to the compressor power relay coil 61 and fan power relay 57 since both are activated simultaneously in operation of the heat pump system.

TABLE V as follows itemizes and describes the commercially available components of the processor circuit of the console 50 of FIGS. 11a, b while TABLE VI as follows itemizes and describes the commercially available components of the processor circuitry of controller 48 of FIGS. 12a, b.

TABLE V

Processor Circuitry For Console 50

| Components of FIGS. 11a, b | Description |
|---|---|
| Resistor 294 | 1 K Ohms, ¼ Watt |
| Resistor 295 | 3.6 Ohms ¼ Watt |
| Resistors 296 | 56 Ohms, 1 Watt each |
| Resistors 298 | 33 K Ohms, ¼ Watt each |
| Resistors 300 | 10 K Ohms, ¼ Watt each |
| Resistors 302 | 390 Ohms, ¼ Watt each |
| Resistors 304 | 2 K Ohms, ¼ Watt each |
| Resistors 306 | 2 K Ohms, ¼ Watt each |
| Resistor 308 | 10 K Ohms, ¼ Watt |
| Resistor 310 | 3.3 K Ohms, ¼ Watt |
| Resistor 312 | 68 Ohms, ½ Watt |
| Resistor 314 | 2.7 K Ohms, ¼ Watt |
| Resistor 316 | 10 K Ohms, ¼ Watt |
| Resistor 318 | 2.7 K Ohms, ¼ Watt |
| Resistor 320 | 100 K Ohms, ¼ Watt |
| Resistor 322 | 39 K Ohms, ¼ Watt |
| Resistor 324 | 1 K Ohms, ¼ Watt |
| Resistor 326 | 510 Ohms, ½ Watt |
| Capacitor 328 | 0.1 mfd 100 v. |
| Capacitor 330 | 6.8 mfd 35 v. |
| Capacitor 332 | 33 mfd 10 v. |
| Capacitor 334 | 0.1 mfd 100 v. |
| Capacitor 336 | 0.1 mfd 100 v. |
| Capacitor 338 | 0.1 mfd 100 v. |
| Capacitor 340 | 0.1 mfd 100 v. |
| Capacitor 342 | 0.1 mfd 100 v. |
| Capacitor 344 | 0.1 mfd 100 v. |
| Capacitor 346 | 0.1 mfd 100 v. |
| Transistors 348 | General Electric D40C1N |
| Integrated Microcircuit 350 | Motorola MCM145101L-3P |
| Integrated Microcircuits 352, 354 | MOSTEK MK3870N |
| Integrated Microcircuit 356 | Texas Instruments SN7445N |
| Integrated Microcircuit 358 | Motorola MC14069UBCP |
| Transistors 360 | Motorola MPS 6562 |
| Transistor 362 | Motorola MPS 2907 |
| Transistor 364 | Motorola MPS 2222 |
| Voltage Regulator 366 | Lambda LAS1505 |
| Coil 368 | 180 mh 5% |
| Coil 370 | 180 mh 5% |
| Diodes 372 | General Electric A15A |
| Diodes 374, 376, 378, 380 | General Electric DT23OH |

TABLE VI

Processor Circuitry For Controller 48

| Components of FIGS. 12a, b | Description |
|---|---|
| Resistors 382 | 3.3 K Ohms, ¼ Watt each |
| Resistors 386, 388, 390 | 4.7 K Ohms, ¼ Watt each |
| Resistor 392 | 1 K Ohms, ¼ Watt |
| Resistor 394 | 20 K Ohms, ¼ Watt |
| Resistor 396 | 150 Ohms, ¼ Watt |
| Resistors 398, 400, 414, 422, 436, 440 | 10 K Ohms, ¼ Watt each |
| Resistor 402 | 680 Ohms, ½ Watt |
| Resistor 404 | 3240 Ohms, ⅛ Watt |
| Resistors 406, 443 | 270 Ohms, ¼ Watt each |
| Resistor 408 | 23.2 K Ohms, ⅛ Watt |
| Resistor 410 | 681 K Ohms, ⅛ Watt |
| Resistor 412 | 68 Ohms, ½ Watt |
| Resistors 416 | 3.3 K Ohms, ¼ Watt |
| Resistor 418 | 1 K Ohms, ¼ Watt |
| Resistors 420 | 2.2 K Ohms, ¼ Watt |
| Resistors 424, 426, 430 | 1 K Ohms, ¼ Watt |
| Resistor 428 | 39 K Ohms, ¼ Watt |
| Resistor 438 | 68 Ohms, ½ Watt |
| Transistor 444 | General Electric GES6016 |
| Transistors 446, 448 | Motorola MPS 2907 |
| Integrated Microcircuit 450 | Mostek MK3870N-10 |
| Integrated Microcircuits 452, 454 | RCA CA 3081 |
| Integrated Microcircuit 456 | RCA CD4067BE |
| Integrated Microcircuit 458 | Texas Instruments TID 126 N |
| Integrated Microcircuit 460 | Motorola MC 14069UBCF |
| Integrated Microcircuit 462 | Signetics SE 555N |
| Integrated Microcircuit 464 | Motorola MC14024BCP |
| Voltage Regulator 468 | Lambda LAS1505 |
| Voltage Regulator 470 | Lambda LAS1512 |
| Capacitors 476, 487, 492, 494 | 0.1 mfd, 100 volt |
| Capacitors 478, 482 | 6.8 mfd, 35 volt |
| Capacitors 480 | 33 mfd, 10 volt |
| Capacitors 485 | 3.3 mfd, 75 volt |
| Capacitors 486 | 0.12 mfd 200 v. |
| Capacitors 488 | 0.01 mfd, 100 volt |
| Capacitors 490 | 4.7 mfd, 35 volt |
| Diodes 498, 500, 502, 504, 506, 508, 510 | DT230H |
| Crystal 514 | 3.579545Mhz. |

While, in accordance with the patent statutes, there has been described what at present is considered to be a preferred embodiment of the invention, it will be obvious to those skilled in the art that various changes and modifications may be made therein without departing from the invention. It is, therefore, intended by the appended claims to cover all such changes and modifications as fall within the true spirit and scope of the invention.

What is claimed is:

1. A method of controlling a multi-state heat pump system to minimize energy usage while the system is being operated to bring the temperature of an enclosed space to a desired temperature level, the method comprising:

establishing a target temperature value representative of the desired temperature;

sensing actual temperature of the enclosed space;

initiating operation of the heat pump system in response to a differential between the actual and target temperatures;

measuring the time rate of change in the actual temperature at the expiration of preselected time intervals during which an increase in operating state of the heat pump system to a higher level of energy usage is inhibited; and increasing the heat pump system to only the next higher operating state upon expiration of said preselected time intervals only when the time rate of change of actual temperature is less than a value required to substantially reach the target temperature within a predetermined time period.

2. A method of controlling a multi-state heat pump system to maintain the system in the most energy efficient operating state consistent with achieving desired temperature conditioning of an enclosed space, the method comprising:

establishing a target temperature representative of the desired temperature for the enclosed space;

sensing actual temperature of the enclosed space and comparing it to the target temperature;

initiating operation of the heat pump system in the most energy efficient operating state to change the actual temperature toward the target temperature;

inhibiting an increase in operating states during a predetermined time interval following initiation of the operation of the heat pump system;

measuring the rate of change in the actual temperature during this state change inhibit time interval; and initiating a state change increase at the expiration of the inhibit time interval only when the rate of change in actual temperature fails to meet a predetermined criterion value which is in effect for the magnitude of the differential between the actual and target temperatures existing at the time of expiration of the inhibit time interval, said criterion value being representative of the rate of actual temperature change needed to reach the target temperature within a preselected time period.

3. The method of claim 2 in which the state change increase inhibit time interval is initiated each time an operating state increase occurs so as to prevent increasing the operating state by more than one state for each inhibit time interval.

4. A method of controlling a multi-state heat pump system to maintain the system in the most energy efficient operating state consistent with achieving desired temperature conditioning of an enclosed space, the method comprising:

establishing a target temperature representative of the desired temperature for the enclosed space;

sensing actual temperature of the enclosed space and comparing it to the target temperature;

providing an operating state change criteria table comprised of (a) a plurality of values of temperature differential between the actual and target temperatures at which operating state changes occur for the heat pump system and (b) a plurality of values of time rate of temperature change which are successively higher valued with successively greater values of differential between actual and target temperatures, the span of temperature differentials resulting in an inter-state change wherein a successive change from one state to the next adjacent operating state occurs, being greater than the span of temperature differential resulting in an intra-state change wherein the successive turn-on and turn-off, in either direction, of a given operating state occurs;

activating the heat pump system in response to a predetermined differential between actual and target temperatures to the most energy efficient operating state to change the actual temperature toward the target temperature;

and thereafter controlling the operation of the heat pump system in accordance with the state change criterion table to periodically change the heat pump system, as necessary, into the most energy efficient operating state which is capable of reaching the target temperature within a preselected time period.

5. The method of claim 4 in which the inter-state temperature differential span is approximately twice the intra-state temperature differential span.

6. The method of claim 4 in which the inter-state differential span is approximately 0.5° C. and the intra-state differential span is approximately 0.25° C.

7. The method of claim 4 in which, following an increase in operating state, a further increase is inhibited for a predetermined time period; the rate of change of actual temperature over this inhibit time period is determined; and an increase in state is initiated at the conclusion of this inhibit time only if the rate of actual temperature is insufficient to result in the actual temperature reaching the target temperature within a predetermined time span.

8. The method of claim 7 in which the predetermined time span is approximately one hour.

9. An energy usage management system for a heat pump system having a plurality of operating states each representing a different level of energy usage, the management system comprising:

means for sensing actual temperature of an enclosed space to be temperature conditioned by the heat pump system;

user-operated input means for establishing a desired temperature setting for the enclosed space;

means for providing an operating state change criteria table comprised of (a) a plurality of values of temperature differential between said actual and desired space temperatures at which operating state changes occur for the heat pump system and (b) a plurality of values of time rate of temperature change which are successively higher valued with successively greater values of differential between actual and target temperatures, the span of temperature being substantially greater than the span of differentials resulting in intra-state changes, wherein inter-state changes are those which occur when moving between adjacent operating states in the same direction as that of an immediately preceding state change and intra-state changes are those which occur when moving between adjacent operating states in a direction opposite to that of the immediately preceding state change;

means for comparing the sensed actual temperature to the desired temperature setting to determine the temperature differential therebetween;

means for periodically comparing the temperature differential to said state change criteria table to derive a control effect representative of whether a particular operating state change is to occur;

and means responsive to said control effect for changing the operating state of the heat pump system to the most energy efficient state which is capable of bringing the actual temperature to the desired temperature setting within a preselected time period.

10. Energy usage management system of claim 9 in which the inter-state differential span is approximately twice the intra-state differential span.

11. Energy usage management system of claim 10 in which the inter-state differential span is approximately 0.5° C. and the intra-state differential span is approximately 0.25° C.

12. Energy management system of claim 9 including means for sensing temperature outside the enclosed space, means for developing a target temperature setting by adjusting the user inserted desired temperature upward as a predetermined function of the difference between the user-inserted desired temperature setting and the outside temperature, and means for substituting the target temperature for the user-inserted temperature setting in determining the temperature differential to be compared to the state change criteria table.

13. Energy usage management system of claim 9 including means for inhibiting a state change during fixed time periods following predetermined changes in operating condition of the heat pump system, means for determining the rate of change in actual temperature during the state change inhibit time interval, and means effective at the end of the state change inhibit time interval to enable a state change to a higher energy usage state only when the rate of change of actual temperature is less than a value required to substantially reach the desired temperature setting within a predetermined time period.

14. Energy management system of claim 13 in which the state change inhibit means is operative following a state change increase to reinitiate a fixed time period for inhibiting a further state change such that only one state change increase is permitted for each state change inhibit time interval.

* * * * *